US009897234B2

(12) United States Patent
Koski et al.

(10) Patent No.: US 9,897,234 B2
(45) Date of Patent: Feb. 20, 2018

(54) STEAM GENERATOR TUBE SUPPORT

(71) Applicant: NuScale Power, LLC, Corvallis, OR (US)

(72) Inventors: William Koski, Corvallis, OR (US); Tamas Liszkai, Corvallis, OR (US); Alex Kruskamp, Corvallis, OR (US); Seth Cadell, Corvallis, OR (US); Weston Pollock, Corvallis, OR (US)

(73) Assignee: NUSCALE POWER, LLC, Corvallis, OR (US)

( * ) Notice: Subject to any disclaimer, the term of this patent is extended or adjusted under 35 U.S.C. 154(b) by 798 days.

(21) Appl. No.: 14/261,830

(22) Filed: Apr. 25, 2014

(65) Prior Publication Data
US 2015/0184775 A1 Jul. 2, 2015

Related U.S. Application Data

(60) Provisional application No. 61/921,044, filed on Dec. 26, 2013.

(51) Int. Cl.
F16L 3/00 (2006.01)
F16L 3/227 (2006.01)
(Continued)

(52) U.S. Cl.
CPC .......... F16L 3/227 (2013.01); F16L 3/02 (2013.01); F22B 37/205 (2013.01)

(58) Field of Classification Search
CPC ......... F16L 3/2235; F16L 3/223; F16L 3/227; F16L 3/23; F16L 3/237; F16L 3/04; F16L 3/24; F16L 3/00; F16L 3/08; F16L 3/1207
(Continued)

(56) References Cited

U.S. PATENT DOCUMENTS 3,854,529 A * 12/1974 Sagan ................ F28F 9/0136
122/510
3,998,268 A * 12/1976 Sagan ................ F28F 9/0132
122/510

(Continued)

FOREIGN PATENT DOCUMENTS

CN 101310157 A 11/2008
CN 101349366 A 1/2009
(Continued)

OTHER PUBLICATIONS

Fricker, H. "Design and Manufacturing Experience for the German Thorium High-Temperature Reactor 300-MW(e) Steam Generator," Nuclear Technology, vol. 28, Mar. 1976, pp. 339-347.
(Continued)

Primary Examiner — Cassandra H Davis
(74) Attorney, Agent, or Firm — Schwabe Williamson & Wyatt

(57) ABSTRACT

A tube support assembly for a steam generator system is disclosed herein, including a sheet or support bar configured to support a plurality of heat transfer tubes of the steam generator system and a set of projections extending from a surface of the sheet or support bar. A distance that the set of projections extend from the surface of the sheet or support bar may be greater than, or equal to, an external diameter of a heat transfer tube. The adjacent tubes of the plurality of tubes may be separated from each other by one or more projections.

20 Claims, 35 Drawing Sheets

(51) Int. Cl.
*F16L 3/02* (2006.01)
*F22B 37/20* (2006.01)

(58) Field of Classification Search
USPC .................................... 248/68.1, 65, 58, 49
See application file for complete search history.

(56) References Cited

U.S. PATENT DOCUMENTS

| | | | | |
|---|---|---|---|---|
| 4,231,421 | A | * | 11/1980 | Eaton .................... F28F 9/0132 165/125 |
| 4,447,942 | A | * | 5/1984 | Jabsen .................. F22B 37/205 165/172 |
| 6,367,430 | B1 | | 4/2002 | Schneider |
| 6,498,827 | B1 | | 12/2002 | Klarner |
| 6,672,260 | B1 | | 1/2004 | Sun |
| 6,772,832 | B2 | | 8/2004 | Schneider |
| 6,810,101 | B2 | | 10/2004 | Klarner |
| 6,914,955 | B2 | | 7/2005 | Klarner |
| 8,695,688 | B2 | | 4/2014 | Schneider et al. |
| 8,794,302 | B2 | | 8/2014 | Schneider et al. |
| 2012/0224663 | A1 | | 9/2012 | Patel et al. |

FOREIGN PATENT DOCUMENTS

| | | |
|---|---|---|
| CN | 203024130 U | 6/2013 |
| CN | 203024131 U | 6/2013 |
| WO | 2015/099854 A1 | 7/2015 |

OTHER PUBLICATIONS

Quade, R. et al, "The Design of the Fort St. Vrain Steam Generators," Nuclear Engineering and Design, vol. 26, 1974, pp. 118-134.

Glasser, R., "Experimental Evaluation of Helical Consolidated Nuclear Steam Generator (CNSG) Tubes and Supports," Prepared for United States Maritime Administration by The Babcock & Wilcox Company, Nov. 1975.

Exner, R., "Analysis and Manufacture of the HTR-100 Steam Generator," Balcke-Dürr AG, pp. 130-140.

International Search Report and Written Opinion; PCT/US2014/057539; Jun. 5, 2015.

* cited by examiner

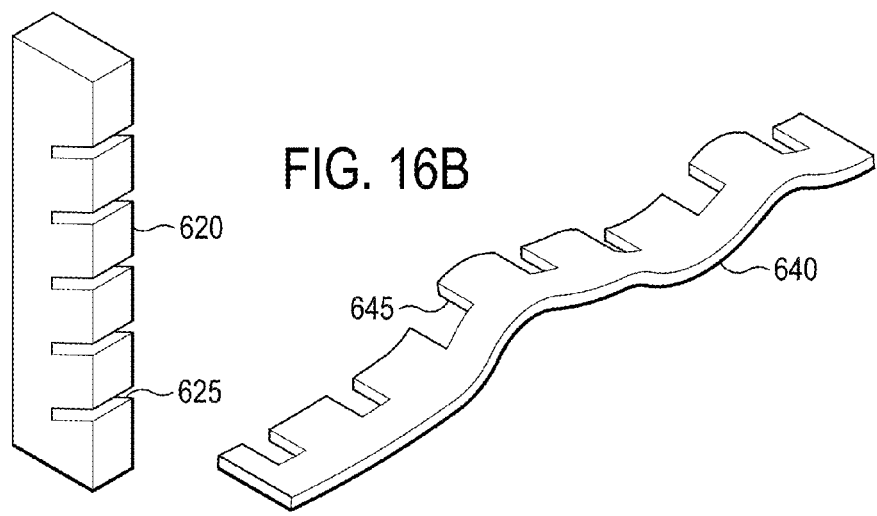

STEAM GENERATOR TUBE SUPPORT

STATEMENT OF RELATED MATTER

This application claims priority to U.S. Provisional Application No. 61/921,044, filed on Dec. 26, 2013, which is incorporated herein by reference in its entirety.

TECHNICAL FIELD

This application relates to the field of power generation, including power systems comprising a steam generator tube assembly.

BACKGROUND

Tube support designs such as those that comprise perforated support plates that may be configured to support and/or to hold all of the steam generator tubes configured for use in a straight or U-tube style SG, may not meet particular design objectives when applied to a SG with helical tubes. For straight and U-tube style SGs the tubes may be inserted through the holes in the support plates and the tube ends inserted directly into the tubesheet(s). For alternate tube designs such as helical tubes, the tubes may be screwed through the holes in such support plates, but the tube ends must be either subsequently bent or bent tube segments welded to the tube ends to facilitate fit-up of the tube ends to the tubesheets. The welds or bends may not meet particular design objectives, and require additional inspection after installation. These additional processes and inspections are time-consuming, expensive, and introduce possible material defects late in the assembly sequence.

Tube support systems which rigidly clamp or otherwise hold the tubes in place may induce stress as a result of thermal expansion. Systems which include a large number of parts to mount and/or hold the individual tubes would require a significant amount of time for installation, inspection, and/or disassembly, and may introduce the possibility of improper assembly. In addition to increasing the assembly time, a large number of parts may increase the likelihood that one or more parts, e.g. screws, clamps, etc., may work loose during operation. Other types of tube support systems which include mounting holes and fit-up shims require complex assembly and restrict movement of the tubes prior to complete installation of the steam generation system. Additionally, it may be difficult to thread the tubes into a support structure which includes mounting holes or other types of mounting structures with restrictive tolerances. The present application addresses these and other problems.

BRIEF DESCRIPTION OF THE DRAWINGS

FIGS. 16A and 16B illustrate an example tube support comprising a lattice.
FIG. 18C illustrates yet a further example tube support comprising one or more collars.

SUMMARY

A tube support assembly for a steam generator system is disclosed herein, including a support bar configured to support a column of heat transfer tubes of the steam generator system and a set of projections extending from a surface of the support bar. A distance that the set of projections extend from the surface of the support bar may be greater than or equal to an external diameter of a heat transfer tube. The adjacent tubes of the column of tubes may be separated from each other by one or more projections.

A tube support assembly for a steam generator system is disclosed herein, including a sheet having a thickness and tabs projecting from a surface of the sheet to support a column of tubes of the steam generator system. Two or more of the tabs may be configured to support a single tube, and adjacent tubes in the column of tubes may be separated from each other by a distance equal to or greater than the thickness of the sheet.

DETAILED DESCRIPTION

In order to facilitate the review of and provide for a better understanding of the various embodiments disclosed herein, a number of terms may be represented by an acronym or abbreviation such as: reactor pressure vessel (RPV), and steam generator (SG), among others.

Figure 1:
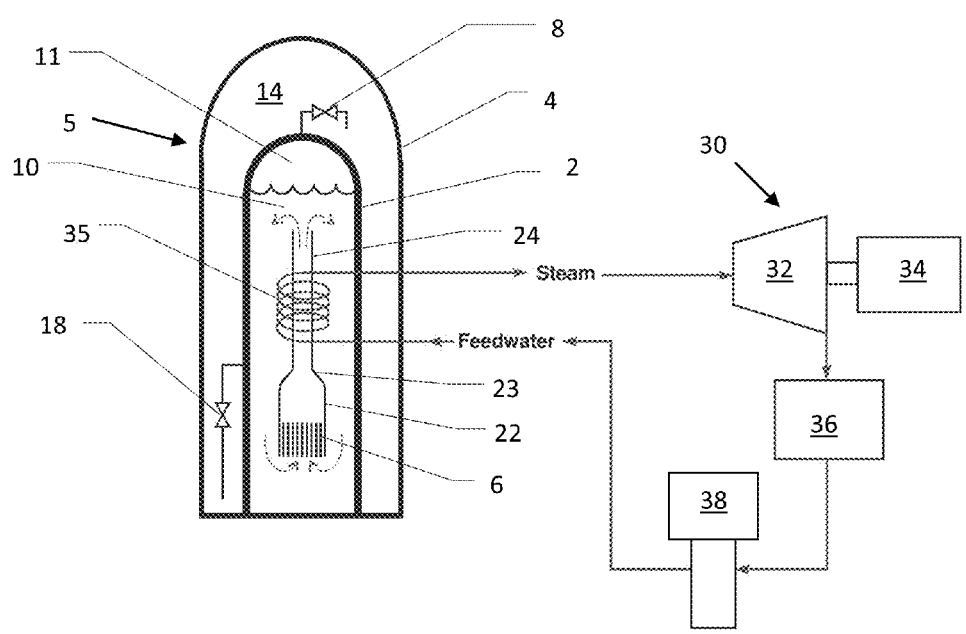
FIG. 1 illustrates an example nuclear reactor module.

FIG. 1 illustrates an example nuclear reactor module 5 comprising a reactor core 6 surrounded by a reactor vessel 2. Coolant 10 in the reactor vessel 2 surrounds the reactor core 6. The reactor core 6 may be located in a shroud 22 which surrounds reactor core 6 about its sides. When coolant 10 is heated by reactor core 6 as a result of fission events, coolant 10 may be directed from shroud 22 up into an annulus 23 located above reactor core 6, and out of a riser 24. This may result in additional coolant 10 being drawn into shroud 22 to be heated in turn by reactor core 6, which draws yet more coolant 10 into the shroud 22. The coolant 10 that emerges from riser 24 may be cooled down and directed towards the outside of the reactor vessel 2 and then returned to the bottom of the reactor vessel 2 through natural circulation.

A steam generator 35 may be configured to circulate feedwater and/or steam in a secondary cooling system 30 in order to generate electricity with a turbine 32 and an electrical generator 34. In some examples, the feedwater passes through the steam generator 35 and may become super heated steam. The secondary cooling system 30 may include a condenser 36 and a feedwater pump 38. In some examples, the feedwater and/or steam in the secondary cooling system 30 are kept isolated from the coolant 10 in the reactor vessel 2.

Reactor vessel 2 may be surrounded by a containment vessel 4. In some examples, containment vessel 4 may be placed in a pool of water, for example as located below ground level. Containment vessel 4 may be configured to prohibit the release of coolant 10 associated with reactor vessel 2 to escape outside of containment vessel 4 and/or into the surrounding environment. In an emergency situation, vapor 11 may be vented from the reactor vessel 2 through a flow limiter 8 into containment vessel 4, and/or coolant 10 may be released through a blowdown valve 18. The rate of release of vapor 11 and/or coolant 10 into containment vessel 4 may vary according to the pressure within reactor vessel 2. In some examples, a decay heat associated with reactor core 6 may be removed, at least in part, through a combination of condensation of vapor 11 on the inner walls of containment vessel 4 and/or by the suppression of coolant 10 released through blowdown valve 18.

Containment vessel 4 may be approximately cylindrical in shape. In some examples, containment vessel 4 may have one or more ellipsoidal, domed, or spherical ends. Containment vessel 4 may be welded or otherwise sealed to the environment, such that liquids and/or gases are not allowed to escape from, or enter into, containment vessel 4. In various examples, reactor vessel 2 and/or containment vessel 4 may be bottom supported, top supported, supported about its center, or any combination thereof.

An inner surface of reactor vessel 2 may be exposed to a wet environment comprising coolant 10 and/or vapor 11, and an outer surface of reactor vessel 2 may be exposed to a substantially dry environment. The reactor vessel 2 may comprise and/or be made of stainless steel, carbon steel, other types of materials or composites, or any combination thereof. Additionally, reactor vessel 2 may include cladding and/or insulation.

Containment vessel 4 may substantially surround the reactor vessel 2 within a containment region 14. Containment region 14 may comprise a dry, voided, and/or gaseous environment in some examples and/or modes of operation. Containment region 14 may comprise an amount of air, a nobel gas such as Argon, other types of gases, or any combination thereof. In some examples, containment region 14 may be maintained at or below atmospheric pressure, for example at a partial vacuum. In other examples, containment region 14 may be maintained at a substantially complete vacuum. Any gas or gasses in containment vessel 2 may be evacuated and/or removed prior to operation of reactor module 5.

Certain gases may be considered non-condensable under operating pressures that are experienced within a nuclear reactor system. These non-condensable gases may include hydrogen and oxygen, for example. During an emergency operation, steam may chemically react with the fuel rods to produce a high level of hydrogen. When hydrogen mixes with air or oxygen, this may create a combustible mixture. By removing a substantial portion of the air or oxygen from containment vessel 4, the amount of hydrogen and oxygen that is allowed to mix may be minimized or eliminated.

Any air or other gases that reside in containment region 14 may be removed or voided when an emergency condition is detected. The gases that are voided or evacuated from the containment region 14 may comprise non-condensable gases and/or condensable gases. Condensable gases may include any steam that is vented into containment region 14.

During an emergency operation, whereas vapor and/or steam may be vented into containment region 14, only a negligible amount of non-condensable gas (such as hydrogen) may be vented or released into containment region 14. It may be possible to assume from a practical standpoint, that substantially no non-condensable gases are released into containment region 14 together with the vapor. Accordingly, in some examples, substantially no hydrogen gas is vented into the containment region 14 together with the vapor, such that the levels and/or amounts of hydrogen together with any oxygen that may exist within the containment region 14 are maintained at a non-combustible level. Additionally, this non-combustible level of oxygen-hydrogen mixture may be maintained without the use of hydrogen recombiners.

Removal of convective heat transfer in air occurs generally at about 50 torr (50 mmHG) of absolute pressure, however a reduction in convective heat transfer may be observed at approximately 300 torr (300 mmHG) of absolute pressure. In some examples, containment region 14 may be provided with, or maintained below, a pressure of 300 torr (300 mmHG). In other examples, containment region 14 may be provided with, or maintained below, a pressure of 50 torr (50 mmHG). In some examples, containment region 14 may be provided with and/or maintained at a pressure level which substantially inhibits all convective and/or conductive heat transfer between reactor vessel 2 and containment vessel 4. A complete or partial vacuum may be provided and/or maintained by operating a vacuum pump, steam-air jet ejector, other types of evacuation devices, or any combination thereof.

By maintaining containment region 14 in a vacuum or partial vacuum, moisture within containment region 14 may be eliminated, thereby protecting electrical and mechanical components from corrosion or failure. Additionally, the vacuum or partial vacuum may operate to draw or pull coolant into the containment region 14 during an emergency operation (e.g. over-pressurization or over-heating event) without the use of a separate pump or elevated holding tank. The vacuum or partial vacuum may also operate to provide a way to flood or fill containment region 14 with coolant 10 during a refueling process.

Flow limiter 8 may be mounted on reactor vessel 2 for venting the coolant 10 and/or vapor 11 into containment vessel 4 during an emergency operation. Flow limiter 8 may be connected or mounted directly to an outer wall of reactor vessel 2, without any intervening structures such as piping or connections. In some examples, flow limiter 8 may be welded directly to reactor vessel 2 to minimize the likelihood of any leaking or structural failures. Flow limiter 8 may comprise a Venturi flow valve configured to release vapor 11 into the containment vessel 4 at a controlled rate. The condensation of vapor 11 may reduce pressure in containment vessel 4 at approximately the same rate that the vented vapor 11 adds pressure to containment vessel 4.

Coolant 10 that is released as vapor 11 into containment vessel 4 may condense on an inner surface of containment vessel 4 as a liquid, such as water. The condensation of the vapor 11 may cause the pressure in containment vessel 4 to decrease, as the vapor 11 is transformed back into liquid coolant. A sufficient amount of heat may be removed through the condensation of vapor 11 on the inner surface of containment vessel 4 to control the removal of decay heat from reactor core 6.

The condensed coolant 10 may descend to the bottom of containment vessel 4 and collects as a pool of liquid. As more vapor 11 condenses on the inner surface of containment vessel 4, the level of coolant 10 within containment vessel 4 may gradually rise. Heat stored in the vapor 11 and/or coolant 10 may be transferred through the walls of the containment vessel 4 to the surrounding environment. By substantially removing gases from the containment region 14, the initial rate of condensation of vapor 11 on the inner surface of containment vessel 4 may be increased by virtue of the evacuated gases. Gases that would normally accumulate at the inner surface of containment vessel 4 to inhibit the condensation of coolant 10 are either at such low levels or are swept from the inner surface due to the natural convection of the coolant 10, that the rate of condensation may be maximized. Increasing the rate of condensation may in turn increase the rate of heat transfer through containment vessel 4.

A vacuum within the containment region 14 may act as a type of thermal insulation during normal operation of the reactor module, thereby retaining heat and energy in reactor vessel 2 where it can continue to be utilized for power generation. As a result, less material insulation may be used in the design of reactor vessel 2. In some examples, a reflective insulation may be used instead of, or in addition to, conventional thermal insulations. Reflective insulation may be included on one or both of reactor vessel 2 or containment vessel 4. The reflective insulation may be more resistant to water damage compared to conventional thermal insulation. In addition, reflective insulation may not impede a transfer of heat from reactor vessel 2 as much as the conventional thermal insulation during an emergency condition. For example, an exterior stainless steel surface of reactor vessel 2 may come into direct contact with any coolant located in containment region 14.

Figure 2:
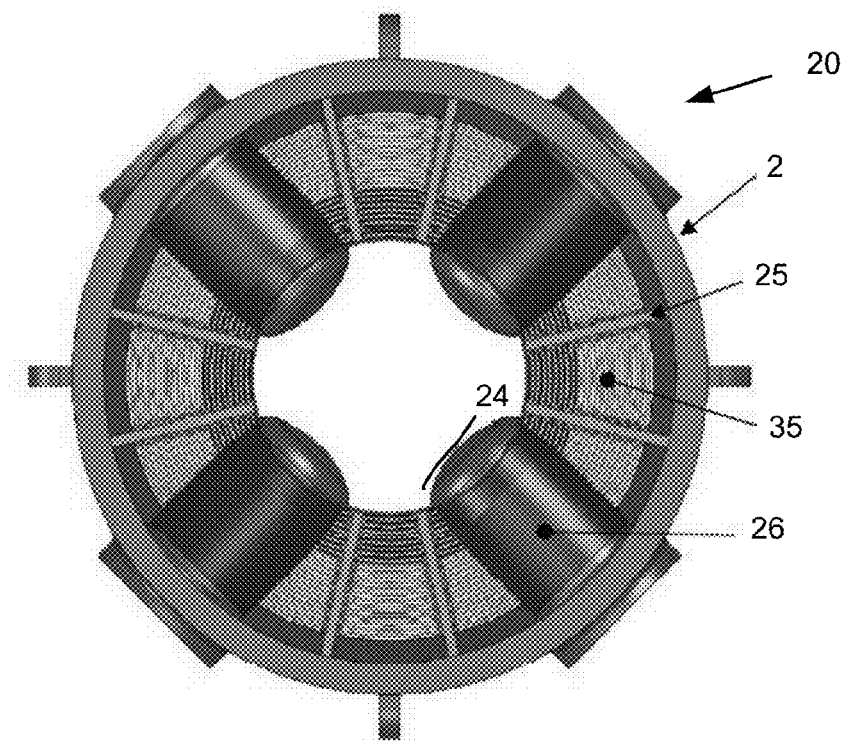
FIG. 2 illustrates an example steam generator assembly.

FIG. 2 illustrates an example steam generator 20 comprising a plurality of tubes 35 and tube support assemblies 25 located in reactor pressure vessel 2. The relative spacing and placement of eight example tube support assemblies 25 about riser 24 is shown for illustrative purposes, relative to one or more steam plenums 26 and a number of steam generation tubes 35. While eight support assemblies are illustrated as being spaced around the circumference of the SG, fewer or more support assemblies are contemplated herein. Additionally, the support assemblies may or may not be spaced equally about the riser depending on particular design criteria and design constraints.

Figure 3:
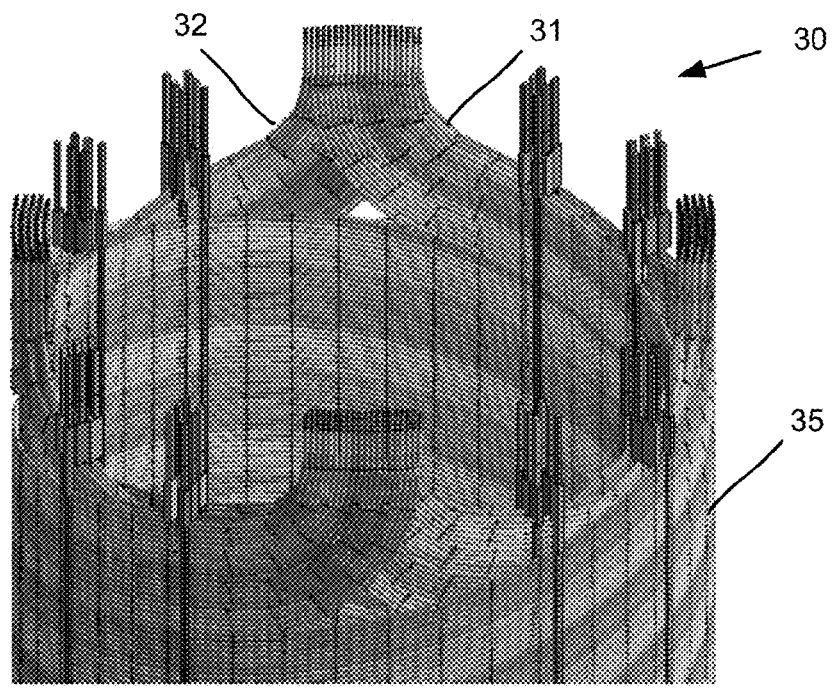
FIG. 3 illustrates a model steam generator tube assembly.

FIG. 3 illustrates a model steam generator tube assembly 30 comprising steam generation tubes 35 arranged in a number of tube bundles. In some examples, successive columns of helical coiled tubes are configured to alternately rotate in a clockwise and counterclockwise direction, respectively, about a riser, such as riser 24 (FIG. 2). Model steam generator tube assembly 30 may be configured to analyze the behavior of tubes 35, for example to determine the resonant frequencies of individual tubes 35 and/or the entire tube bundle assembly.

Figure 4:
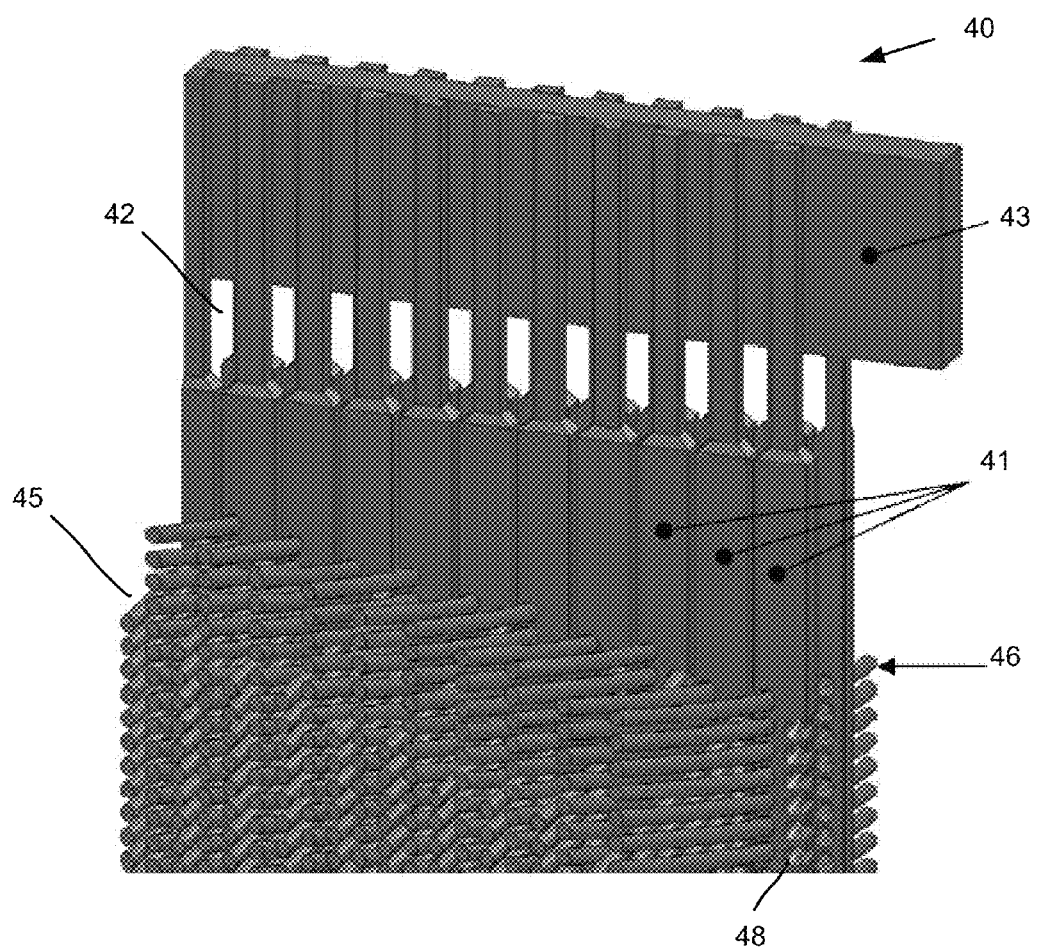
FIG. 4 illustrates an example tube support assembly comprising a number of bars with slots.

FIG. 4 illustrates an example tube support assembly 40 comprising a number of bars 41 with slots 48 for one or more columns or rows of tubes 45 to rest in. Each of the bars 41 have a number of slots 48 machined on either side corresponding to the number of tubes supported. Bars 41 may be staggered such that a given column of tubes is supported by two adjacent bars. In some examples, bars 41 may be welded to a beam 43 that extends radially across the SG and welds to the RPV or other appropriate structure. One column of tubes 46 is illustrated as being partially removed in order to show the relative position of the slots 48.

In some examples, slots 48 may be located on both the front and back surfaces of the bars 41. The slots are positioned on the front surface of one bar 41 and on the back surface of a second bar 41 that is displaced circumferentially from the first bar such that the slots in both bars support the same column of tubes. During assembly of an example steam generator, a first column of heat transfer tubes may be positioned in the slots 42 in a first bar 41 that has been attached to beam 43. A second bar 41 may then be positioned to support the same column of heat transfer tubes on their opposite face and attached to beam 43. A second column of heat transfer tubes may then be positioned in the slots on the opposite face of the second bar, and a third bar with slots may be positioned to support the second set of heat transfer tubes and attached to beam 43. Additional sets of heat transfer tubes and bars may be sequentially installed next to each other for a plurality of rows and/or columns associated with the steam generator assembly.

In other examples, a first portion or half of through-holes 48 may be located along one or more sides of a first bar, and a second portion or half of through-holes 48 may be located along one or more sides of a second bar. By connecting the first bar next to the second bar, the first portion or half of a through-hole may be mated with the second portion or half of the through-hole to form a complete through-hole which may be configured to surround a heat transfer tube about its entire circumference.

In still other examples, the through-holes 48 may be located entirely within the bars 41. During assembly of an example steam generator, a first bar comprising one or more columns of heat transfer tubes may be attached to beam 43. Next, a second bar comprising one or more additional columns of heat transfer tubes may be installed next to the first bar and attached to the beam. Additional bars and columns of heat transfer tubes may be sequentially installed next to each other.

Figure 5A:
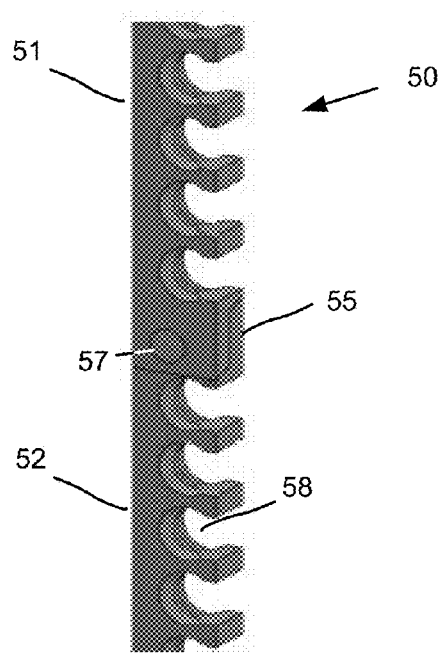
FIGS. 5A and 5B illustrate an example steam generator tube support assembly for an in-line bar configuration comprising a pinned joint connecting a first bar and second bar arranged as a single-column.

FIG. 5A illustrates an example steam generator tube support assembly 50 for an in-line bar configuration comprising a pinned joint 55 comprising a pin 57 connecting a first bar 51 and second bar 52 arranged as a single-column. One or both of first bar 51 and second bar 52 may comprise a plurality of slots 58 or partial holes on one side of the bar, through which a number of tubes may be supported and/or mounted.

Figure 5B:
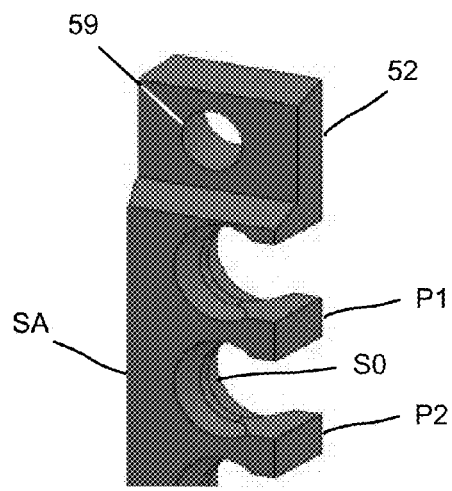

FIG. 5B illustrates an enlarged view of second bar 52 with pin 57 of FIG. 5A removed from a pin hole 59. A similar hole such as pin hole 59 may be located in first bar 51. In some examples, a first in-line bar, such as tube support assembly 50 may be attached to a beam, such as beam 43 (FIG. 4). A first set, row, or column of tubes may be installed in the first in-line bar, and then a second in-line bar may be positioned adjacent to the first in-line bar and attached to the beam. Then, a second set, row, or column of tubes may be installed in the second in-line bar, similar to one or more of the examples described above with respect to FIG. 4. In some examples, the first in-line bar and the second in-line bar may be mated together first and then attached to the beam at the same time.

In some examples, a tube support may comprise a support bar, such as first bar 51 or second bar 52. The support bar may be configured to support a plurality of heat transfer tubes. A set of projections may extend from a surface S0 of the support bar to form one or more slots, partial through-holes or through-holes, such as through-hole 58. In some examples, a distance that the set of projections extend from the surface S0 of the support bar (or back of the slot) may be greater than or equal to an external diameter of the plurality of heat transfer tubes that are being supported. In some examples, adjacent tubes of the plurality of tubes may be separated from each other by one or more of the set of projections.

The surface S0 of the support bar may be configured to contact a set of heat transfer tubes comprising a first heat transfer tube and a second heat transfer tube. The portion of the support bar that contacts the first heat transfer tube may be located intermediate a first projection P1 and a second projection P2. The first projection P1 may be configured to contact a top surface of the first heat transfer tube. Similarly, the second projection P2 may be configured to contact a lower surface of the first heat transfer tube. Additionally, the second projection P2 may be configured to contact an upper surface of the second heat transfer tube. The second heat transfer tube may be positioned adjacent to the first heat transfer tube. For example, the set of heat transfer tubes may be arranged as a column or row of heat transfer tubes supported by the support bar.

In some examples, a second support bar, such as steam generator tube support assembly 50, may be positioned adjacent to the first support bar, similar to one or more of the examples described above with respect to FIG. 4. Additionally, both the first projection P1 and the second projection P2 may be configured to extend from the first support bar and contact an adjacent surface, or back side, of the second support bar. The respective position of the adjacent surface is shown as surface SA in FIG. 5B for reference. In some examples, a circumference of a heat transfer tube supported by the steam generator tube support assembly may be surrounded by the surface of the first support bar S0, the first projection P1, the second projection P2, and the adjacent surface of the second support bar.

In some examples, the second support bar may comprise a second set of projections including at least one projection that extends from a second surface of the second support bar to form a plurality of slots, partial through-holes, or through holes. The second surface may be located on an opposite side of the second support bar as the adjacent surface. The second surface of the second support bar may be configured to contact the second set of heat transfer tubes at a location intermediate a plurality of projections that extend from the second surface of second bar.

Figure 6A:
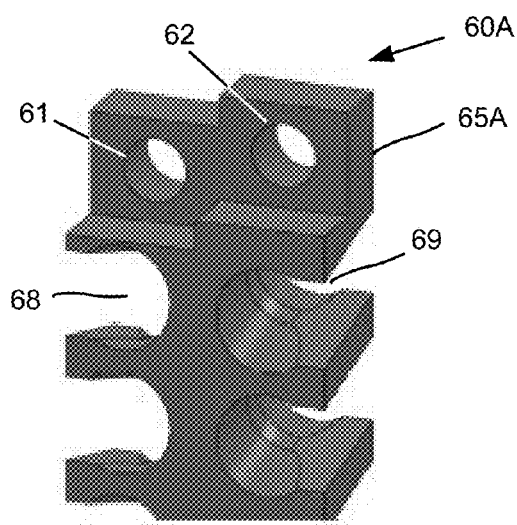
FIGS. 6A and 6B illustrate two example steam generator tube support assemblies comprising a pinned joint for staggered bars.
Figure 6B:
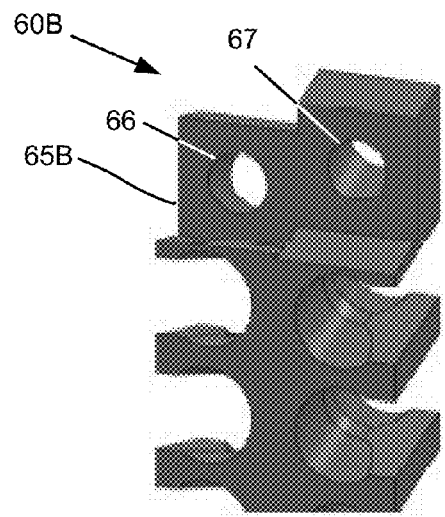

FIGS. 6A and 6B illustrate two example steam generator tube support assemblies 60A and 60B, respectively, comprising a pinned joint for staggered bars arranged as two-column bars, containing slots or partial holes 68 and 69 on two sides of each bar. The pinned joint may be used so that the bars may be machined in shorter segments to simplify manufacturing and/or reduce associated manufacturing costs of the steam generator tube support assemblies. Steam generator tube support assembly 60A is illustrated as comprising a pinned joint 65A comprising a first pin hole 61 and a second pin hole 62 configured to retain horizontally oriented pins. Steam generator tube support assembly 60B is illustrated as comprising a pinned joint 65B comprising a first pin hole 66 and a second pin hole 67 configured to retain non-horizontally oriented angled pins.

Steam generator tube support assemblies 60A and 60B may be configured to carry two columns of tubes, and some of these column pairs may have different numbers and differing tube spacing. A pair of tubes in adjacent columns that cross each other at a given height may not be near the same location on the next wrap along the SG. Steam generator tube support assemblies 60A and 60B may comprise a plurality of through-holes 68 or partial holes, through which a number of tubes may be supported and/or mounted. For example, a first column of tubes may be supported by through-holes 68 located on a first side of tube support assembly 60A, and a second column of tubes may be supported by through-holes 69 located on a second side of tube support assembly 60A.

Figure 7:
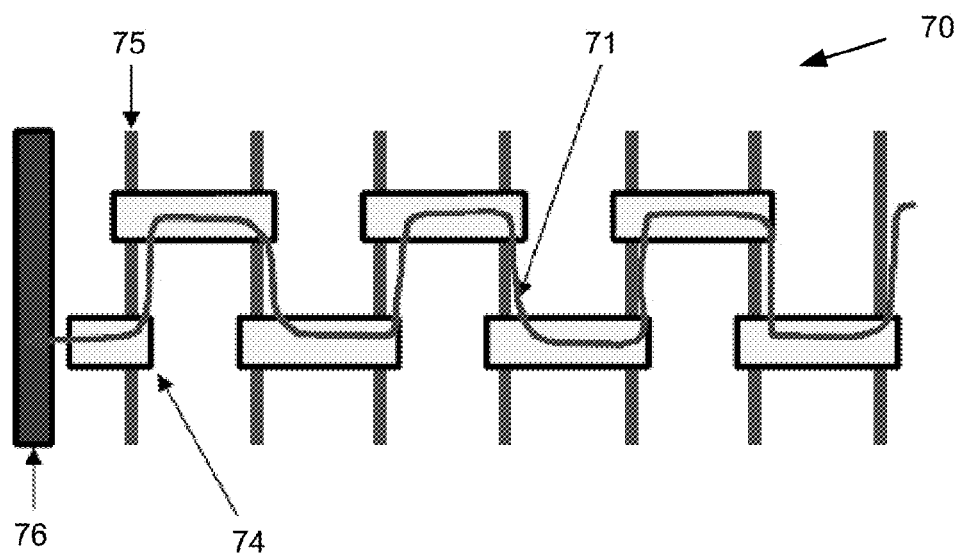
FIG. 7 illustrates a top view of a seismic load path through an example tube support assembly comprising staggered support structures.

FIG. 7 illustrates a top view of a seismic load path 71 through an example tube support assembly 70 comprising staggered support structures 74. Gaps between support structures 74 are exaggerated for purposes of illustration. A track and/or bumper arrangement may be configured between the tubes and/or on a wall of RPV 76 to increase a lateral stiffness of tube support assembly 70.

The bending stresses of the tubes 75 may increase toward the outer columns where the assembly stacks up against RPV 76. Under a lateral seismic load, the maximum deformation of support structures 74 may increase along the axis of acceleration (circumferential deformation at this location). By arranging support structures 74 in a staggered orientation, the loads may be transferred between support structures 74 through the tubes 75 until they eventually reach the riser or RPV 76.

Figure 8:
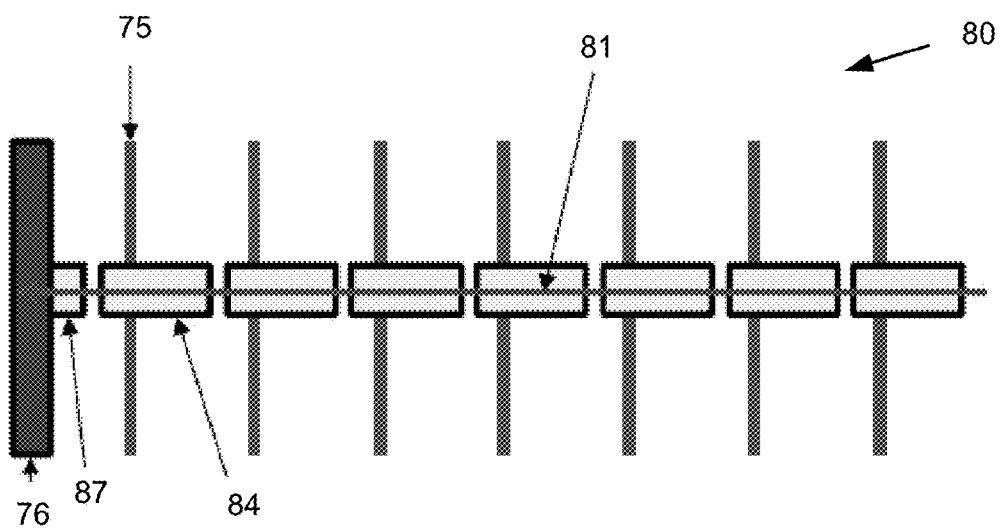
FIG. 8 illustrates a top view of a seismic load path through an example tube support assembly comprising in-line support structures.

FIG. 8 illustrates a top view of a seismic load path 81 through an example tube support assembly 80 comprising in-line support structures 84. The in-line configuration of support structures 84 may alleviate stresses and/or provide a path for the loads to pass through support structures 84 rather than the tubes 75. Tube support assembly 80 may be configured to provide a load path through support structures 84 that is compressive and easily transferable. A spacer 87 may be located between RPV 76 and the support assembly 80 located closest to RPV 76. In some examples, spacer 76 may be attached to RPV 76.

The staggered and in-line support structures illustrated in FIGS. 7 and 8 constrain the tubes 75 differently. For example, staggered tube support assembly 70 supports each tube with a pair of slots spaced apart from each other along each tube. So doing provides a vertical moment constraint that limits tubes 75 rotation in the support about the horizontal radial axis. In-line tube support assembly 80, on the other hand, may comprise one slot at each support location which, in some examples, may be configured to allow the tubes 75 to rotate about the horizontal radial axis within support structures 74.

Figure 9A:
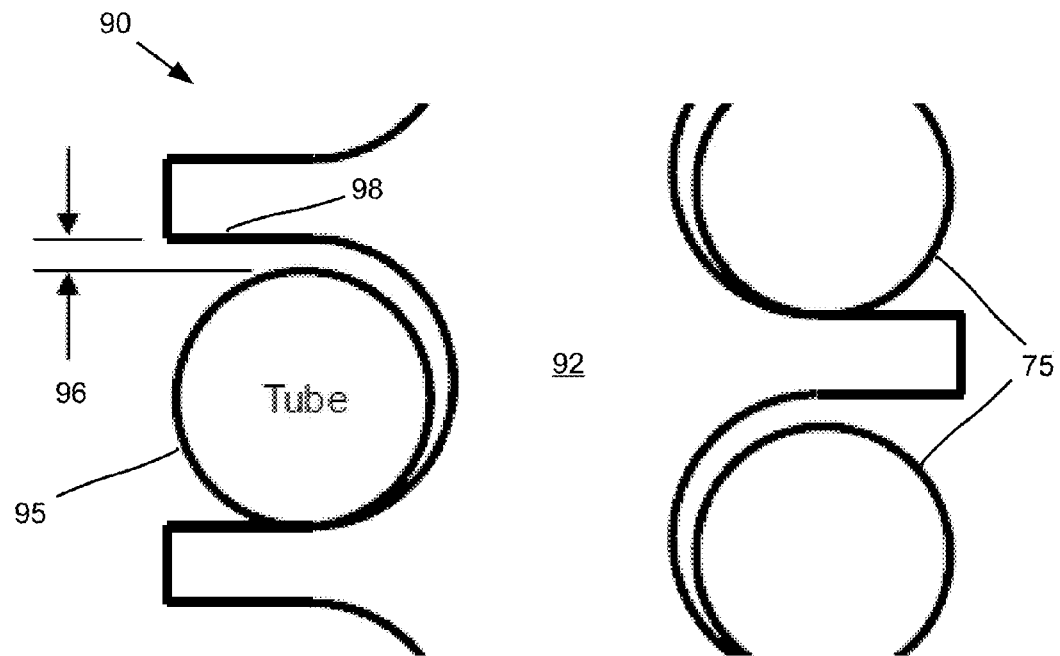
FIG. 9A illustrates a side view of an example tube support assembly.

FIG. 9A illustrates a side view of an example tube support assembly 90 with a plurality of tubes 75 arranged on either side of a support structure 92. Support structure 92 may comprise a plurality of tube supports or partial holes, through which a tube 95 may be supported and/or mounted. In some examples, a tube support 98 may be manufactured with a particular tolerance and/or spacing to provide for a diametrical gap 96 between tube 95 and an inner surface of tube support 98.

Figure 9B:
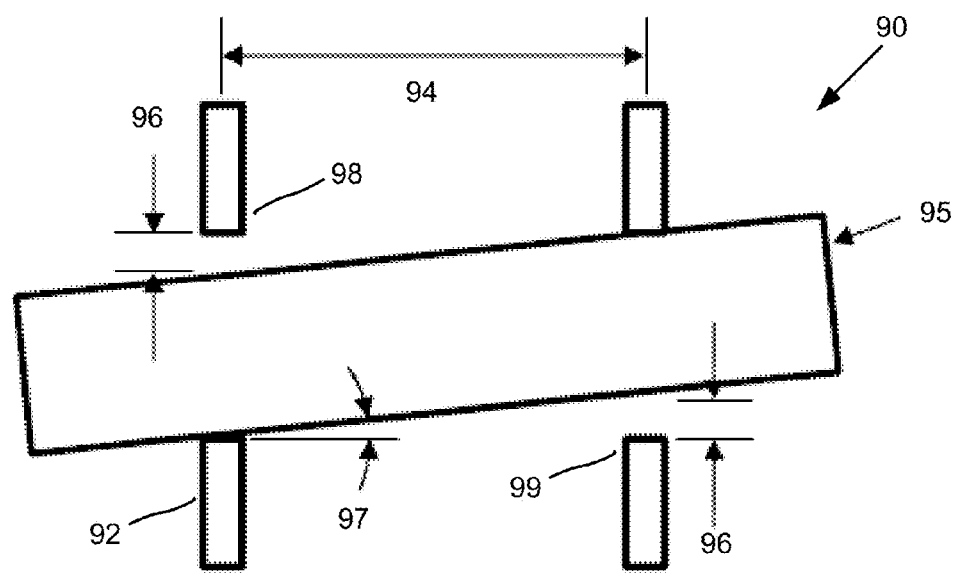
FIG. 9B illustrates a front view of the tube support assembly of FIG. 9A.

FIG. 9B illustrates a front view of two staggered tube support assemblies 90 of FIG. 9. Tube support assemblies 90 may be configured to provide a vertical moment constraint of tube 95 when the tube 95 pivots away from its nominal inclination with respect to support structure 92 by an angle 97. Angle 97 may result from, or be determined by, a combination of diametrical gap 96 and a distance 94 between tube support 98 and a second tube support 99. Tube 95 may be configured to pivot slightly before hitting the inner surfaces of one or both tube support 98 and second tube support 99.

Diametrical gap 96 may help reduce or correct any misalignment between one or more tube supports and/or adjacent support structures. In some examples, support structure 92 may be configured to provide moment constraint during certain operating conditions, such as during lower frequency oscillation with higher amplitudes.

The tube support system may be stiffened in the circumferential direction by adding bumpers or tracks on the RPV wall and the riser outer wall to capture the outermost and innermost support structures in the circumferential direction. Tube support systems may be configured with segmented and full-length support structures, in either an in-line or staggered configuration. For example, a full-length support structure may comprise a bar that spans the entire height of the steam generator.

Figure 10:
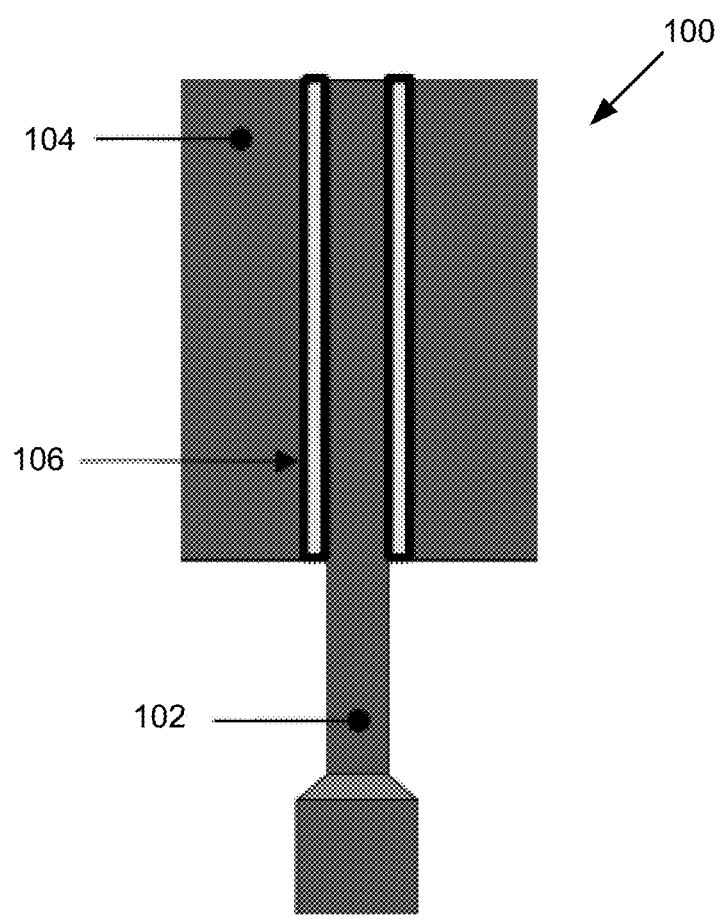
FIG. 10 illustrates an example tube support assembly comprising a support bar and support beam with welded attachment.

FIG. 10 illustrates an example tube support assembly 100 comprising a support bar 102. Support bar 102 may be attached to a beam 104. In some examples, support bar 102 may use a weld area 106 to attach the support bar 102 to the beam 104. Beam 104 may comprise a radial beam located at the top or bottom of the steam generator that is attached to an adjacent structure.

Support bar 102 may be secured to beams 104 at the top and bottom of the bar by one or more methods of attachment, including a welded top and bottom, a welded top and floating bottom, a pinned top and bottom, and a pinned top and floating bottom. Bending stress in the bar 102 may primarily result from the thermal expansion differential between the materials used for support bar 102 and the RPV. For example, a stainless steel support bar may expand more than a low allow steel RPV, which may cause the support bar 102 to become compressed. In some examples, tube support assembly 100 may be configured to constrain the lateral motion and rotation at the bottom of the support bar 102 and to allow the support bar 102 to move vertically.

Figure 11:
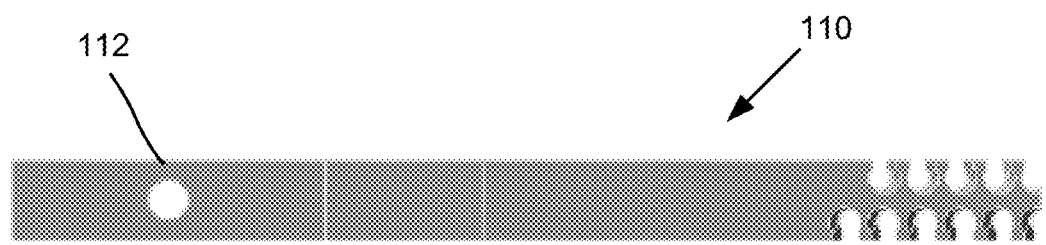
FIG. 11 illustrates an example support bar with a hole to accommodate pinned assembly to a support beam.

FIG. 11 illustrates an example support bar 110 for a steam generator tube support assembly. Support bar 110 is illustrated as comprising a pinned end 112. A pinned connection may provide an alternative to welding the support bars to the beams, as described with reference to FIG. 10. Since the high stresses may develop at a welded joint, a pinned connection may reduce the amount of stress. In some examples, the pinned connection associated with support bar 110 may be configured to rotate about the circumferential axis of the steam generator. Rotation about the radial axis may be constrained.

In example support structures using a pinned top connection and a floating bottom connection, the bottom connection allows relative motion about the circumferential axis of the steam generator, and also allows vertical displacement relative to the bottom beam to avoid thermal stresses.

In general, stresses near the connection of the bar to the radial beams may be reduced by using either a floating bottom connection or a pinned connection or, in certain examples, combination of both connection types. The floating bottom support may be configured to relieve the support bar from large thermal stresses, and the pinned connection may be configured to relieve stress caused by the high moment near at the attachment. In some examples, the steam generator support bars may be configured to use a welded top connection and a guided floating bottom connection.

Figure 12B:
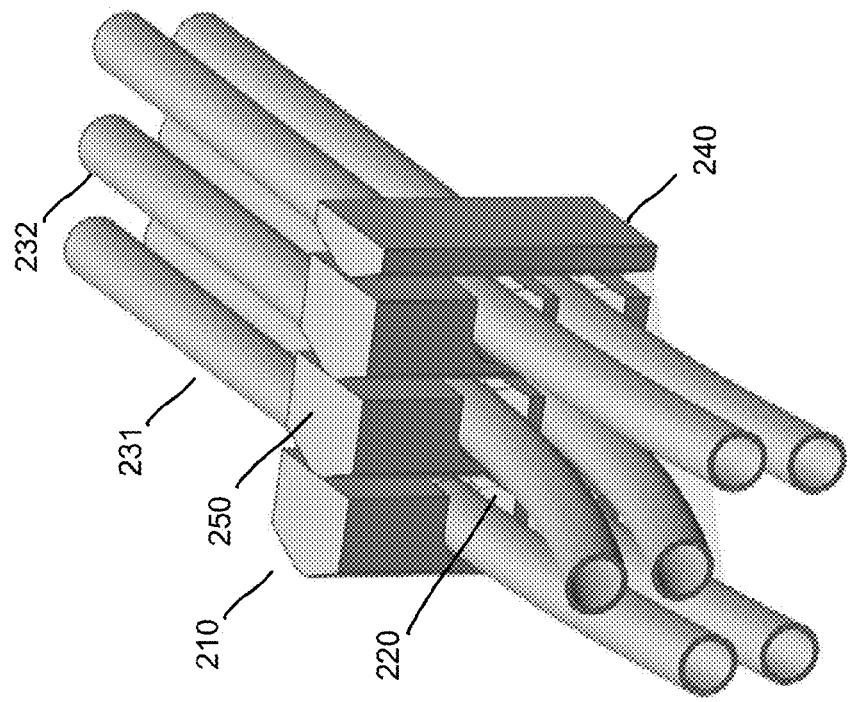
FIG. 12B illustrates an isometric view of the FIG. 12A in-line support bars comprising a plurality of tube supports.
Figure 12A:
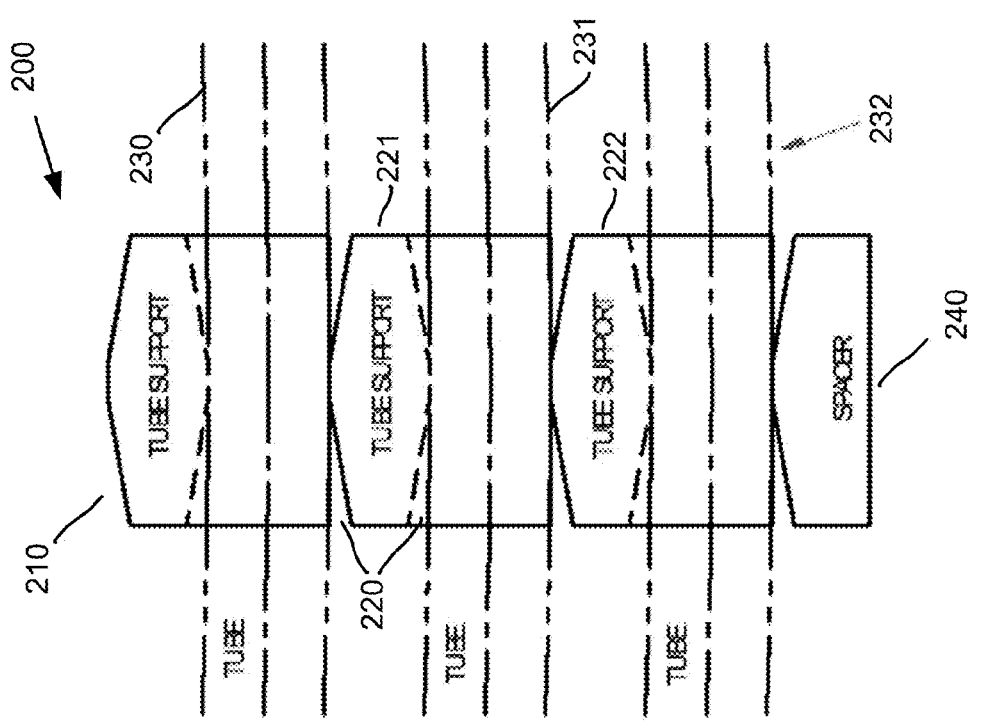
FIG. 12A illustrates an example tube support comprising in-line support bars with a plurality of slots.

FIG. 12A illustrates an example tube support 200 comprising in-line bars 210, each with a plurality of slots 220 on one side and a chamfer on the opposite side. The slots 220 may be formed between a number or set of projections that extend from a surface of bar 210, such as a first projection 221 and a second projection 222. The slots 220 may be oriented in vertical columns to accommodate a plurality of tubes 230. The slots 220 may be chamfered with a landing region.

In some examples, tube support 200 may comprise a support bar, such as bar 210. Bar 210 may be configured to support the plurality of heat transfer tubes 230. A set of projections may extend from a surface of bar 210. In some examples, a distance that the set of projections extend from the surface of bar 210 may be greater than or equal to an external diameter of any one tube of the plurality of heat transfer tubes 230. In some examples, adjacent tubes of the plurality of tubes 230 may be separated from each other by one or more of the set of projections.

A surface of bar 210 may be configured to contact a set of heat transfer tubes comprising a first heat transfer tube 231 and a second heat transfer tube 232. The surface of bar 210 that contacts first heat transfer tube 231 is located intermediate first projection 221 and second projection 222. The first projection 221 may be configured to contact a top surface of the first heat transfer tube 231. Similarly, the second projection 222 may be configured to contact a lower surface of the first heat transfer tube 231. Additionally, the second projection 222 may be configured to contact an upper surface of the second heat transfer tube 232. The second heat transfer tube 232 may be positioned adjacent to the first heat transfer tube 231. For example, the set of heat transfer tubes may be arranged as a column or row of heat transfer tubes supported by support bar 210.

FIG. 12B illustrates an example tube support system comprising a plurality of tube supports, such as tube support 210 of FIG. 12A. A plurality of tube supports may be combined together to form a plurality of columns of tubes. In some examples, a spacer 240 may be attached and/or located adjacent to the innermost and outermost columns of tubes.

Bar 210 may be configured to provide radial contact with a second bar 250 and/or column of tubes located adjacent to bar 210. Bar 210 may be configured to support and/or carry the weight of a first set of tubes 231. Additionally, second bar 250 may be configured to support a second set of tubes 232. The first set of tubes 231 and the second set of tubes 232 may be arranged as two columns or two rows of tubes, depending on an orientation of tube support 200, similar to one or more of the examples described above with respect to FIG. 4. Tube support 200 may be oriented in a substantially horizontal or a substantially vertical position according to various example configurations. A backside of bar 210 may be chamfered to provide appropriate radial restraint to the adjacent column of tubes.

In some examples, each tube support may be configured with slots for one column of tubes, and the back of the adjacent tube support may be configured to keeps the tubes from coming out of the slots and to provide tube restraint in the radial direction. Additionally, there may be one row of in-line bars for each support assembly. A chamfered landing region of the tube support 200 may be configured to provide a bearing area when contacting adjacent bars and/or tubes. Similarly, a chamfered spacer bar may be provided at the end of the row of tube supports to provide lateral support for the last support bar and/or the last column of tubes. Tube support 200 may be configured to provide a good radial contact surface, allowing for horizontal load transfer between the plurality of tube supports, such as during seismic events.

In some examples, the second bar 250 may be positioned adjacent to the support bar 210. Additionally, both the first projection 231 and the second projection 232 may be configured to extend from support bar 210 and contact an adjacent surface, or back side, of the second bar 250. A circumference of a heat transfer tube, such as first heat transfer tube 231, may be surrounded by a surface of support bar 231, first projection 221, second projection 222, and an adjacent surface of second bar 250. Second bar 250 may comprise a second set of projections including at least one projection that extends from a second surface of second bar 250. The second surface may be located on an opposite side of second bar 250 as the adjacent surface. The second surface of second bar 250 may be configured to contact the second set of heat transfer tubes 232 at a location intermediate two projections that extend from the second surface of second bar 250.

Figure 13A:
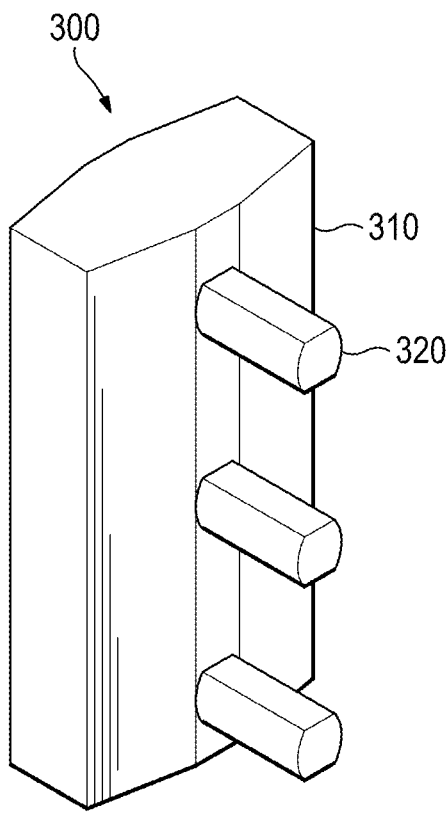
FIG. 13A illustrates an example tube support system comprising a column with posts.
Figure 13B:
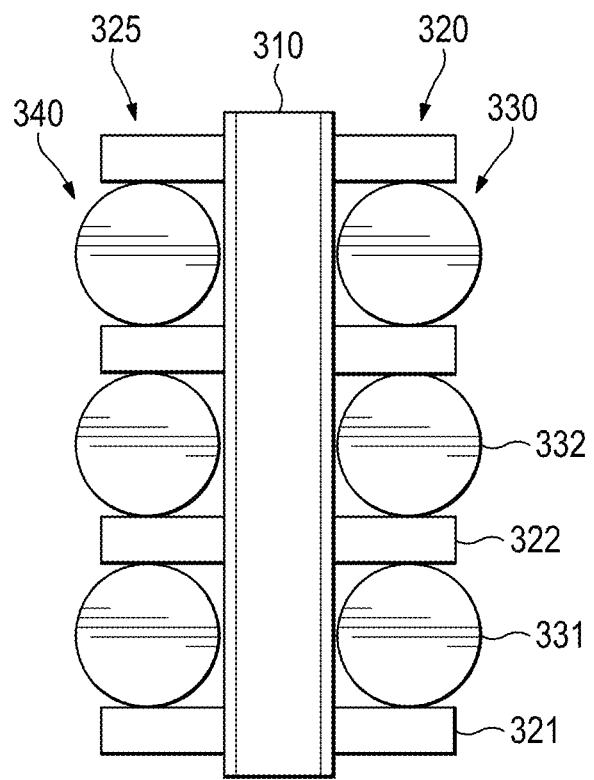
FIG. 13B illustrates a side view of the tube support system of FIG. 13A comprising a first set of posts and a second set of posts.

FIG. 13A illustrates an example tube support system 300 comprising a bar 310 with posts 320. The posts 320 may be machined and/or otherwise manufactured to have relatively flat upper surfaces that contact the tubes 330, as shown in FIG. 13B. The angle of these flat surfaces will correspond with the angle of the tubing being supported. In some examples, posts 320 may be formed integral to the bar 310, such as by machining away material from bar 310. Posts 320 may be configured with both flat top and bottom surfaces to provide vertical support for the tubes 330. Tube support system 300 may be oriented in a substantially horizontal or a substantially vertical position according to various example configurations.

FIG. 13B illustrates a side view of an example tube support system comprising a first set of posts, such as posts 320, located on a first side of bar 310 and a second set of posts 325 located on a second side of bar 310. Posts 320 may be configured to support a first set of tubes 330, and the second set of posts 325 may be configured to support a second set of tubes 340. In some examples, posts 320 may extend through the bar 310 to provide support for two sets of tubes on either side of the bar 310.

Figure 13C:
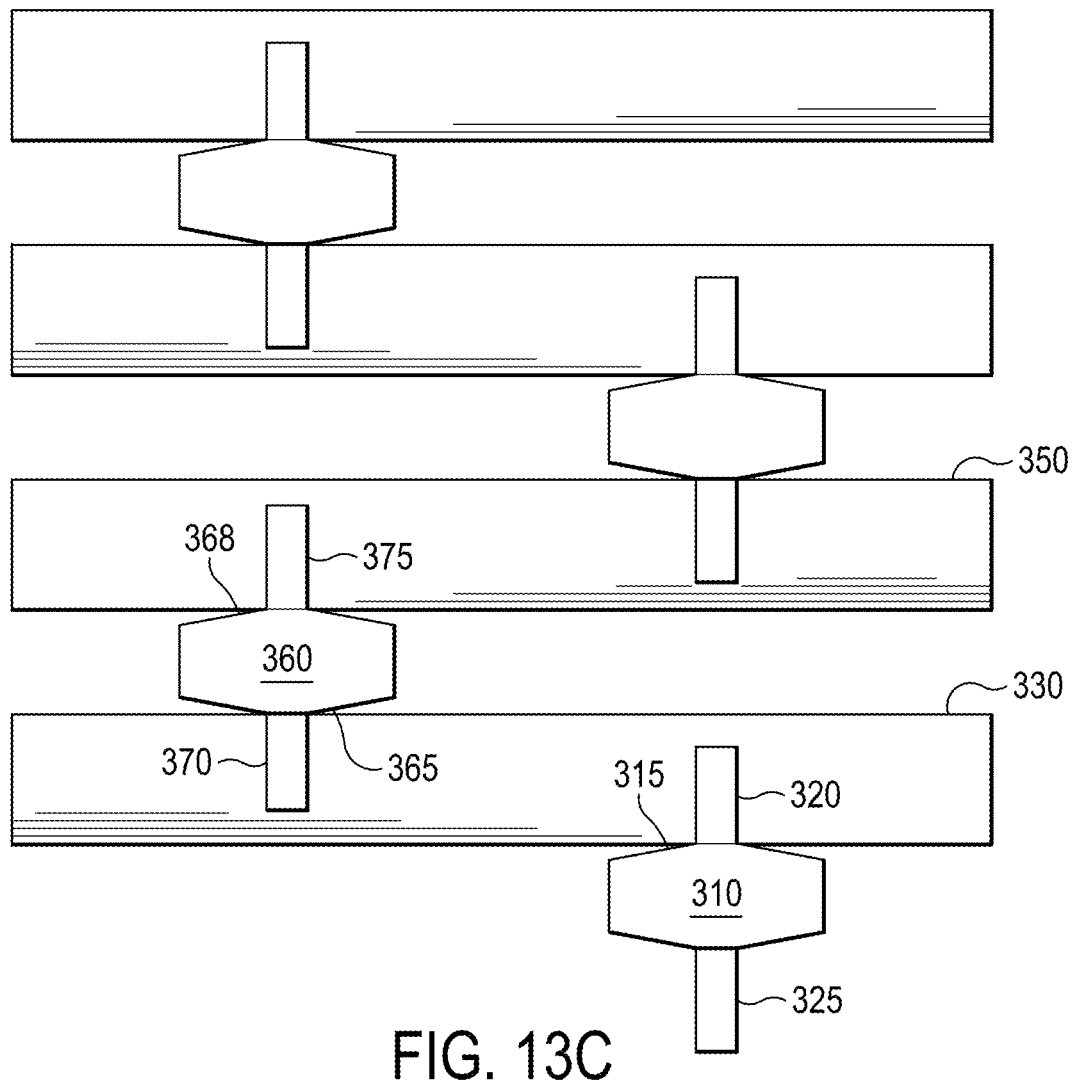
FIG. 13C illustrates a top view of the tube support system of FIG. 13A comprising a plurality of bars.

FIG. 13C illustrates a top view of a tube support system comprising a plurality of bars, such as bar 310 of FIG. 13A and a second bar 360. In some examples, the support system may comprise alternately positioned or staggered support bars along the length of the first set of tubes 330. The tube support system may be configured so that the first set of tubes 330 rest on projections shaped as posts 320 rather than being supported by slots, as in some of the other designs described herein.

In some examples, the tube support assembly may comprise a support bar, such as bar 310 configured to support a plurality of heat transfer tubes of the steam generator system. A set of projections, such as posts 320, may extend from a surface of the support bar 310 by a distance that is less than an external diameter of an adjacent set of tubes, such as first set of tubes 330. In some examples, the set of projection may extend from the surface of the support bar 310 by a distance that is greater than or equal to an external diameter of a heat transfer tube. Adjacent sets of tubes may be separated from each other by one or more of the set of projections. In some examples, the adjacent sets of tubes may be separated from each other according to the width of the support bars. For example, the first set of tubes 330 may be separated from a second set of heat transfer tubes 350 by the width of the second bar 360. Second bar 360 may be positioned adjacent to support bar 310, similar to one or more of the examples described above with respect to FIG. 4.

In some examples, a circumference of a heat transfer tube, such as first heat transfer tube 331, may be surrounded by a surface 315 of support bar 310, the first projection 321, the second projection 322, and an adjacent surface 365 of second bar 360. Second bar 360 may comprise a set of projections 370 including at least one projection that extends from the adjacent surface 365 of the second support bar and contacts one or more tubes in the first set of heat transfer tubes 330. For example, first heat transfer tube 331 may contact the surface 315 of bar 310, the first projection 321, the second projection 322, and the adjacent surface 365 of the second bar 360.

Second bar 360 may comprise a second set of projections 375 including at least one projection that extends from a second surface 368 of second bar 360. The second surface 368 may be located on an opposite side of second bar 360 as the adjacent surface 365. Additionally, the second surface 368 of second bar 360 may be configured to contact the second set of heat transfer tubes 350.

Figure 14:
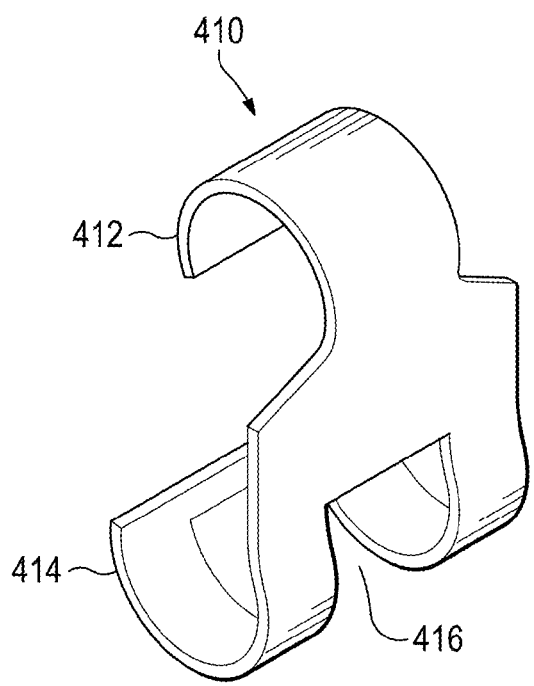
FIG. 14 illustrates an example tube support comprising a clip.

FIG. 14 illustrates an example tube support comprising a clip 410. Clip 410 may comprise an upper portion 412 configured to support a first tube and a lower portion 414 configured to support a second tube. The lower portion 414 may comprise a slot 416.

Figure 15:
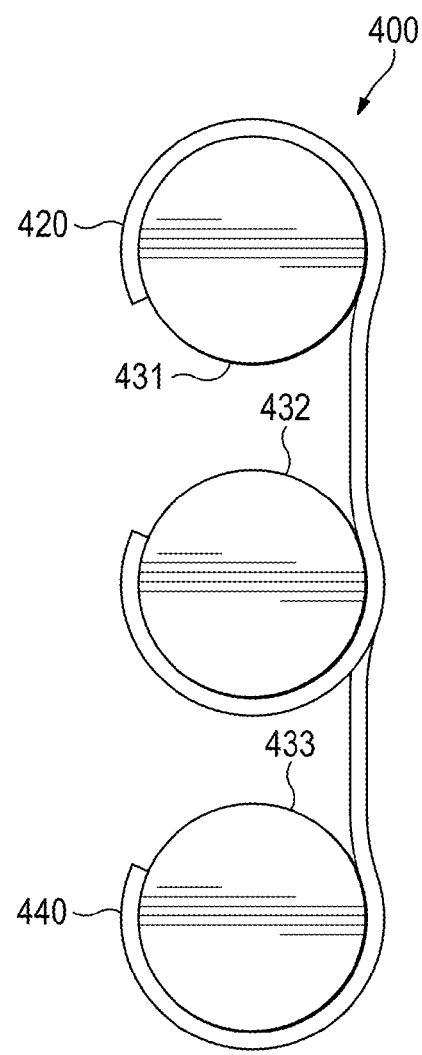
FIG. 15 illustrates an example tube support comprising a plurality of clips.

FIG. 15 illustrates an example tube support 400 comprising a plurality of clips. More than one clip may be used to support the same tube. For example, a first clip 420 may be configured to support both a first tube 431 and a second tube 432, similar to that described with respect to clip 410. First tube 431 may be located adjacent second tube 432 in a tube assembly.

A second clip 440 may be configured to support both the second tube 432 and a third tube 433, similar to that described with respect to clip 410. A lower portion of first clip 420 and an upper portion of second clip 440 may be configured to support the same tube, namely the second tube 432. Second tube 432 may therefore be supported by both the first clip 420 and the second clip 440.

In some examples, the upper portion of second clip 440 may be configured to be located within the lower portion of the first clip 420. For example, the upper portion of second clip 440 may be configured to pass through a slot, such as slot 416 shown in clip 410, associated with the lower portion of first clip 420. Second tube 432 may pass between both the upper portion of second clip 440 and the lower portion of first clip 420. In some examples, a plurality of clips may be chained together to support a column or row of tubes. Additionally, the clips 410 may be configured to reduce and/or dampen vibration of the tubes, for example, by rigidly connecting a row and/or a column of tubes together.

Tube support 400 may be configured to vertically connect adjacent tubes together with a c-shaped clip. In some examples, a column of 240 tubes may have 239 clips connecting them together. An upper clip and a lower clip may be provided at the top and bottom of tube support 400 to attach to a beam. The clips may comprise a tongue-and-groove design to keep them vertically aligned with each other. Additionally, the clips may be configured to snap onto the tubes to prevent them from coming loose during operation. Tube support 400 may help reduce vibrations of the tubes by rigidly connecting several tubes together, similar to a floating support.

Figure 16A:
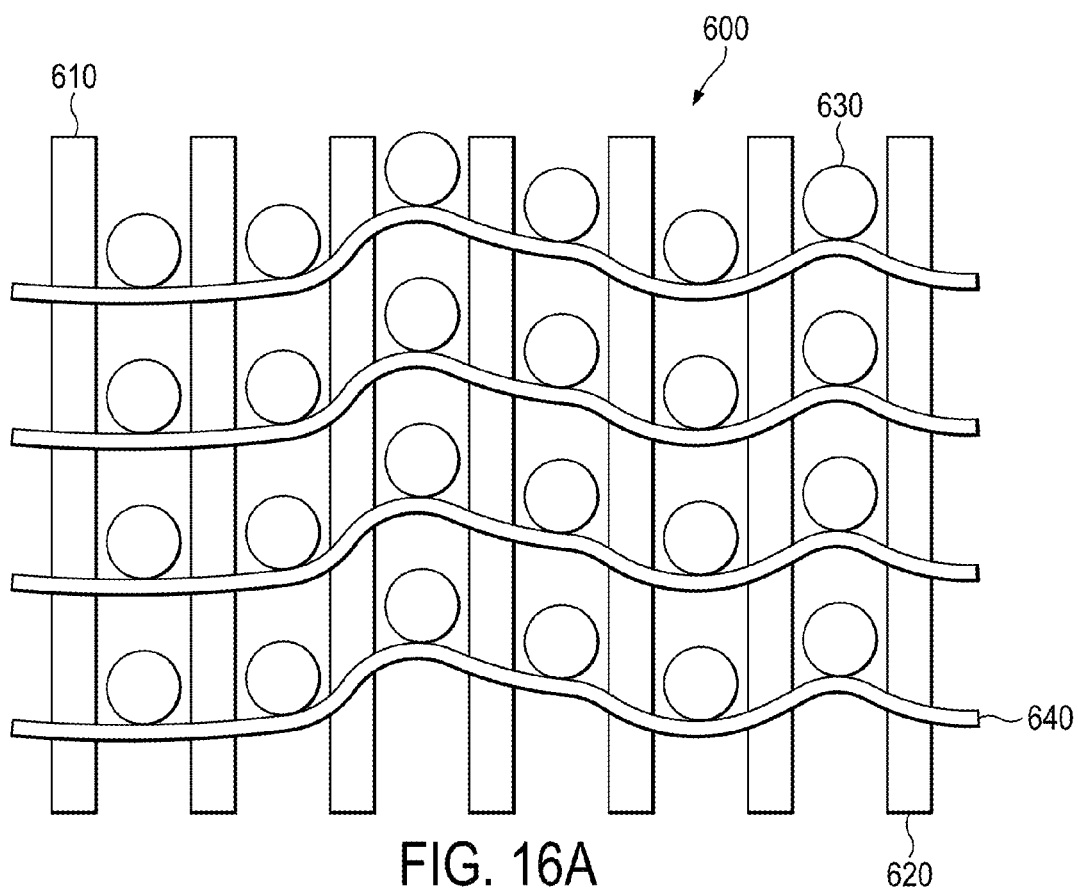

FIGS. 16A and 16B illustrate an example tube support 600 comprising a lattice 610. The lattice 610 may comprise a plurality of vertical support bars, such as vertical bar 620, and a plurality of cross bars and/or strips, such as bar 640. As illustrated in FIG. 16B, one or both of vertical bar 620 and cross bar 640 may comprise one or more notches, such as notch 645, that are configured to provide means for connecting, interlocking, and/or assembling lattice 610. In some examples, an angled notch 625 may be used to provide for an angled connection between vertical bar 620 and cross bar 640 to provide additional lateral support of the lattice 610.

Cross support bar 640 is shown with an undulating or wave-like profile, as needed to support each column of tubes in their intended elevation, whereas vertical support bar 620 may comprise a substantially linear or straight rigid body. In some examples, the vertical and cross bars may be configured to provide for a damping effect to reduce any vibration, or seismic induced stress that may occur to the tubes 630. In some examples, cross bar 640 may be configured to support tubes in a first column that are vertically offset from tubes in an adjacent column.

One or more cross bars may be welded to vertical support bars, or they may be configured to join with an interference fit. Tube support 600 may be configured to support a plurality of columns of tubes having the same vertical pitch. With a constant vertical pitch the same design for cross bar 640 may be used at any elevation in the lattice of tube support 600. The cross bars 640 carry horizontal seismic loads.

Figure 17A:
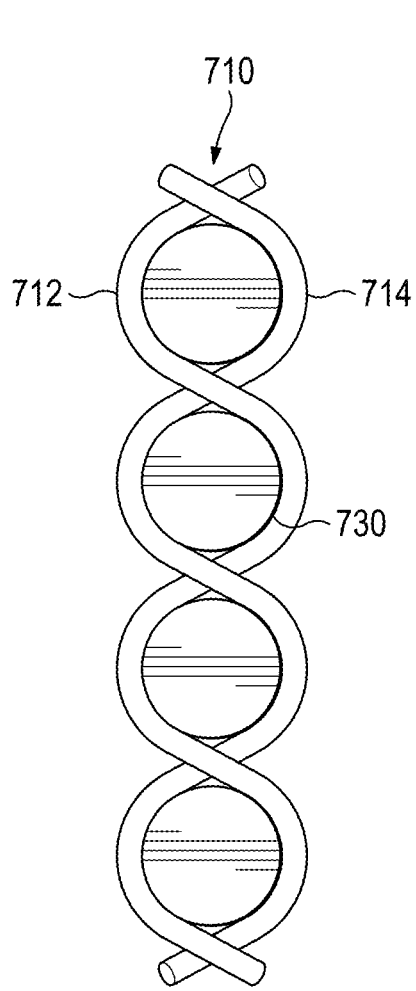
FIG. 17A illustrates an example tube support comprising a wire rope (cable) tube support.

FIG. 17A illustrates an example tube support comprising a chained attachment 710. In some examples, chained attachment 710 may comprise one or more woven wire ropes or cables, such as a first attachment 712 and a second attachment 714. In some examples, first attachment 712 and/or second attachment 714 may comprise relatively flexible materials that may be woven about and/or around tubes 730.

First attachment 712 may be configured to wrap around a first half of a particular tube and second attachment 714 may be configured to wrap around a second half of the particular tube in order to support the tube about all sides of the tube. One or both of first attachment 712 and second attachment 714 may continue in an undulating manner to wrap about a series or column of adjacent tubes 730.

In some examples, first attachment 712 may be positioned adjacent to second attachment 714 to form a chain of loops through which tubes 730 may be supported. A plurality of chained attachments may be positioned at multiple positions around the tube bundle to support the tubes 730 in both the vertical and lateral directions at a plurality of different points. The tube support may be suspended in a vertical orientation. For example, an upper portion of chained attachment 710 may be connected to a vertical support.

Figure 17B:
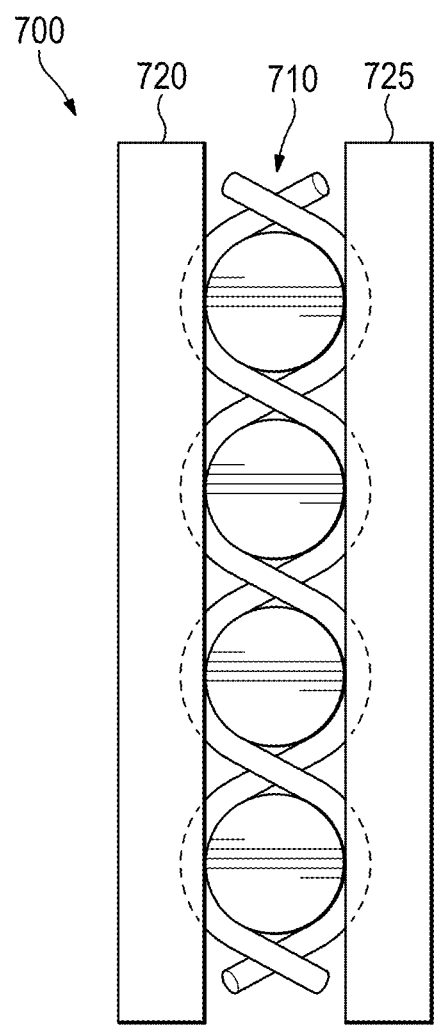
FIG. 17B illustrates an example tube support comprising the wire rope (cable) of FIG. 17A and one or more bars.

FIG. 17B illustrates an example tube support 700 comprising chained attachment 710 of FIG. 17A and one or more bars. Chained attachment 710 may be positioned intermediate and/or adjacent to one or more vertical bars, such as a first bar 720 and a second bar 725. The vertical bars may provide for additional lateral support of the tubes, so that a first column of tubes is not allowed to contact an adjacent column of tubes which may be supported by a separate chained attachment.

Figure 18A:
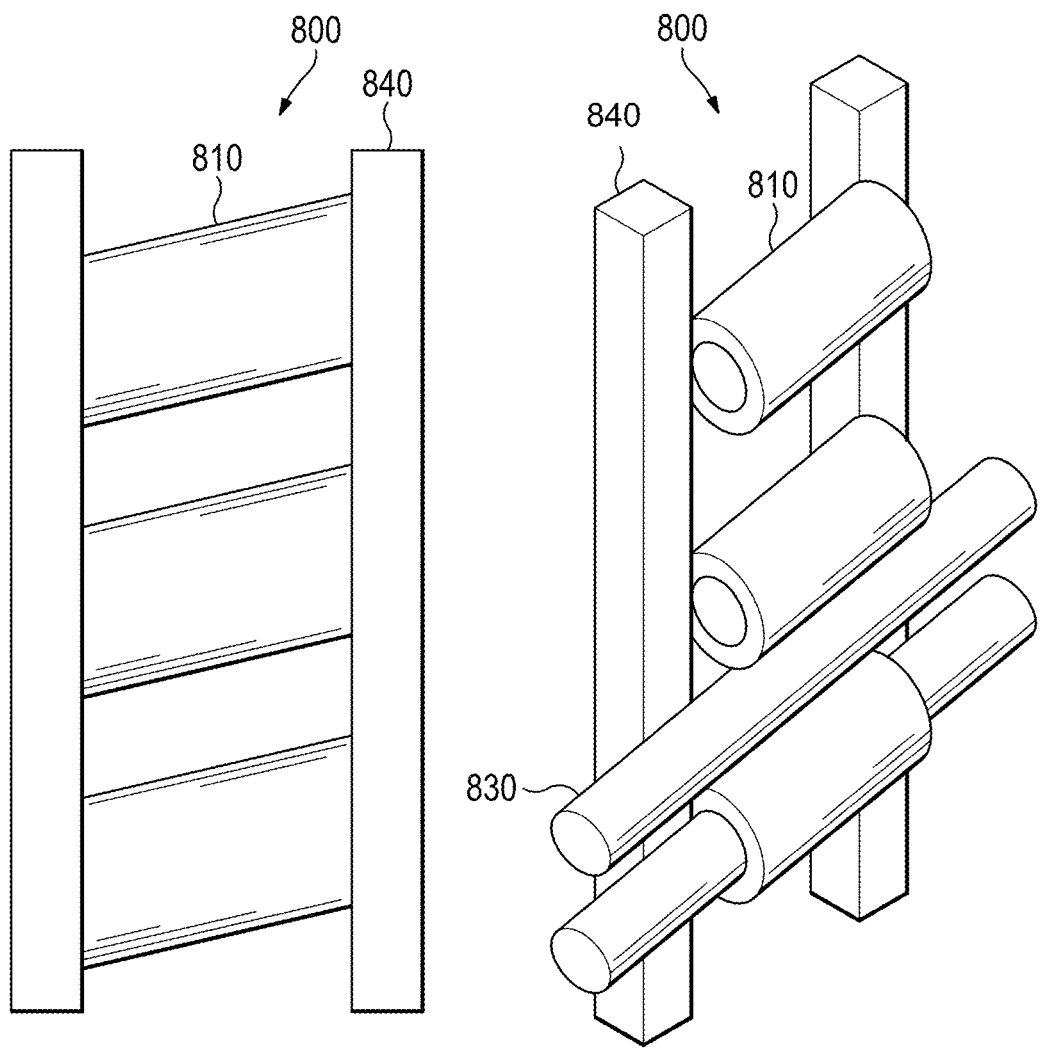
FIG. 18A illustrates a front view and a rear view of an example tube support comprising collars.

FIG. 18A illustrates a front view and a rear view of an example tube support 800 comprising collars 810. The collars 810 may be configured to support one or more tubes 830 that pass through and/or adjacent to the collars 810. One or more bars 840 may be configured to support the collars. For example, a first end of the collars 810 and a second end of the collars 810 may be connected and/or welded to one or more bars 840.

Figure 18B:
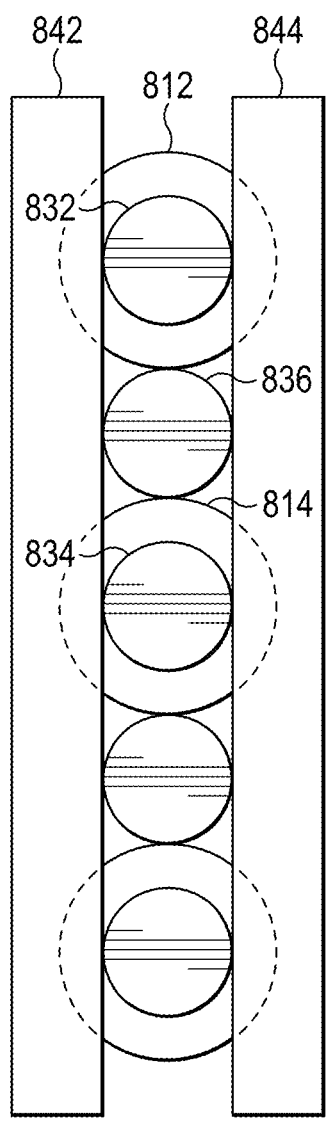
FIG. 18B illustrates an example tube support with a first collar positioned between a first bar and a second bar.

In some examples, collars 810 may be located intermediate and/or adjacent to two or more bars. The two or more bars may be configured to provide additional lateral support of the collars 810. For example, as illustrated in FIG. 18B, a first collar 812 may be positioned between a first bar 842 and a second bar 844. Additionally, a second collar 814 may be positioned between first bar 842 and second bar 844. A first tube 832 is illustrated as passing through and/or being supported by first collar 812, and a second tube 834 is illustrated as passing through and/or being supported by second collar 814. In some examples, a third tube 836 may be positioned and/or supported intermediate first collar 812 and second collar 814. For example, a space may be provided between first collar 812 and second collar 814 to accommodate an intermediate tube, such as third tube 836.

First bar 842 may be spaced apart from second bar 844 by a distance which is approximately equal to, or slightly larger than, an outer diameter of tubes 830. Accordingly, bars 840 and/or collars 810 may be configured to provide both lateral and vertical support of the tubes 830 by providing tube support 800 with at least four points of contact for each of the tubes, e.g., at each of the upper, lower, left, and right sides of the tube. Lateral, seismic loads may be transferred through the collars 810 and/or bars 840 rather than the tubes 830.

In some examples, the tubes 830 may not be physically constrained until the collars 810 are connected and/or welded to the bars 840. For examples, the collars 810 may be welded to the bars 840 after the tubes 830 have been inserted into the collars 810. The collars 810 may be connected to the bars 840 after the tubes have been assembled. In some examples, collars 810 may be cut at an angle from a longer tube, and the edges of collars 810 may be beveled to prevent wear on the tubes 830.

Tube support 800 may be configured with relatively short collars that slide over the steam generator tubes 130 and attach to a plurality of bars that hang between columns. A welded collar design may be configured with tubular-shaped collars that are welded to straight support bars on either end of the collar. A small radial gap between the collar and the SG tube may be configured to allow the collar to be slid onto the tube from the end and positioned next to the bars. Once in place, the collar may be welded to the bars. In some examples, the collars may be welded to the bars from both adjacent columns. In other examples, the collar may be welded to the bars behind the column of tubes. In still other examples, every other tube may be welded to one or more of the bars, and the intermediate tubes may rest between the adjacent collars and bars.

FIG. 18C illustrates yet a further example tube support 850 comprising one or more collars 875. Tube support 850 may comprise stacking collars 875 that have cutouts or cylindrical holes that would allow installation of the steam generator tubes. Tube support 850 may be configured with a corresponding collar for every tube. Collars 875 may be stacked in a track 870 formed by two vertical bars 871, 872. Track 870 may comprise a backing plate 880 welded onto the two bars 871, 872. Additionally, collars 875 may be welded to backing plate 880. In other examples, track 870 may be machined from a single piece. In some examples, the track and collars may contain a feature such as a key way that captures the collars in the track.

The stacking of the collars 875 may be configured to provide a vertical support of the tubes, and lateral support may be provided by the bars 871, 872. In some examples, where the collars are keyed to the track, lateral support of the tubes may also be provided by the collars. In some example steam generator assemblies, a heat transfer tube may be inserted into one of the collars 875 prior to being attached to track 870. A plurality of collars 875 may similarly be placed along a length of the heat transfer tube and then, e.g., sequentially, attached to a plurality of tracks 870 arranged about the steam generator assembly. In other examples, one or more of the collars 875 may be attached to track 870 prior to inserting the heat transfer tubes.

In addition to providing circumferential support about the heat transfer tubes, collars 875 may be configured to project from backing plate 880 such that a back surface 876 of collars 875 may be approximately lined up with a front surface 886 of first bar 871 and/or second bar 872. Accordingly, the heat transfer tube supported by one of the collars 875 may contact both the back surface 876 of a collar and the front surface 886 of a bar. In some examples, an opposite surface 896 of collars 875 may line up with a surface of an adjacent bar. For example, tube support 850 may be positioned adjacent a second tube support having one or more bars and a slot in which collars 875 may be similarly located and/or attached.

Figure 19A:
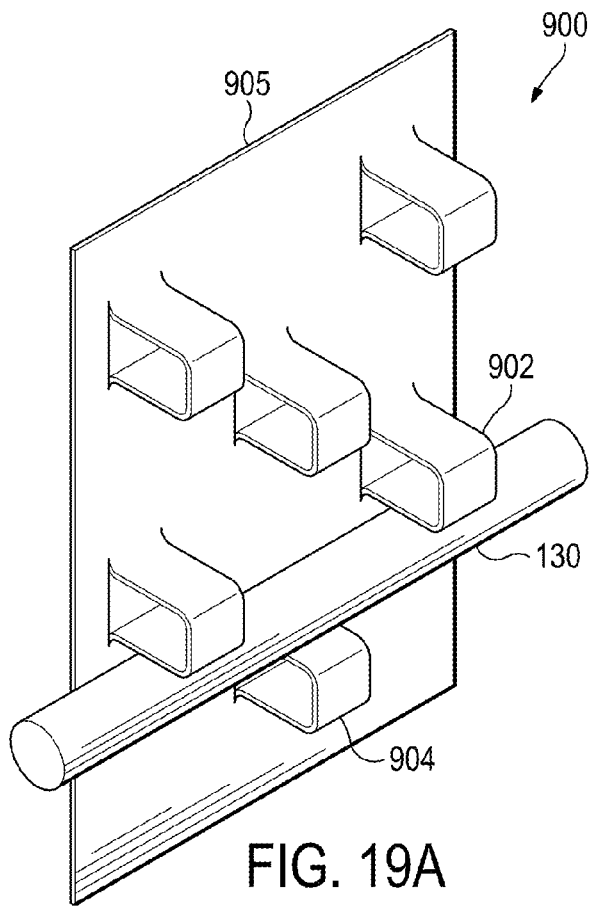
FIG. 19A illustrates an isometric view of an example tube support comprising a mounting sheet.

FIG. 19A illustrates an isometric view of an example tube support 900 comprising a mounting sheet 905. The mounting sheet 905 may comprise a plurality of projections 902, 904 configured to support one or more tubes, such as tube 130. In some examples, the projections may be configured in vertically offset columns. A first projection 902 in a first column may be configured to contact and/or support an upper surface of tube 130, and a second projection 904 in a second column may be configured to contact and/or support a lower surface of the tube 130.

Figure 19B:
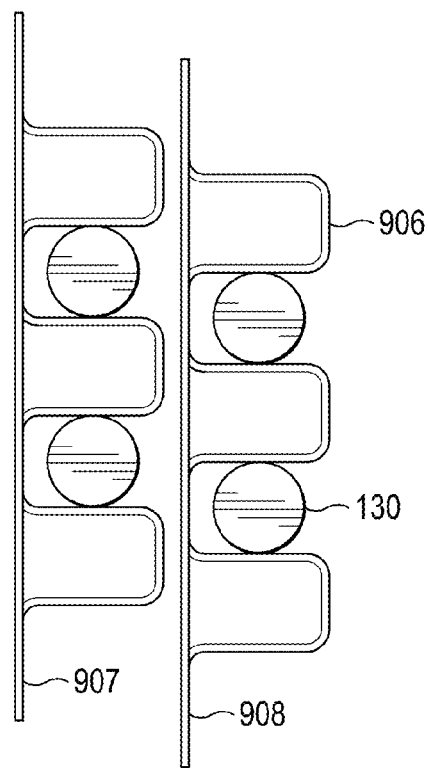
FIG. 19B illustrates a side view of a plurality of mounting sheets positioned adjacent to each other.

FIG. 19B illustrates a side view of a plurality of mounting sheets 907, 908, similar to mounting sheet 905 of FIG. 19A, shown stacked and/or positioned adjacent to each other to provide additional lateral support and/or retention of the tube assembly. For example, a tube 130 may be positioned and/or supported between two adjacent mounting sheets 907, 908. Each of the mounting sheets 907, 908 may comprise a plurality of projections 906 configured to support one or more tubes.

In some examples, a first portion of projections 906 may be configured to project out of a first side of a mounting sheet to support a first column of tubes, and a second portion of projections 906 may be configured to project out of a second side of the mounting sheet to support a second column of tubes.

Figure 20:
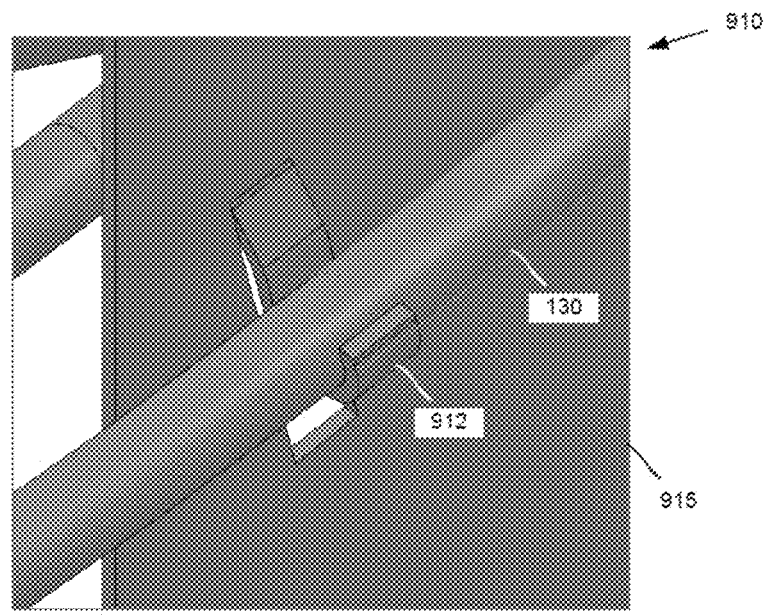
FIG. 20 illustrates an example tube support comprising a mounting sheet.

FIG. 20 illustrates an example tube support 910 comprising a mounting sheet 915. The mounting sheet 915 may comprise a plurality of projections 912 configured to support one or more tubes 130. The projections 912 may be configured as one or more hooks. Some of the projections 912 may be configured to support a lower portion of the tubes 130, and others of the projections 912 may be configured to support an upper portion of the tubes 130. For example, projections 912 may comprise a number of inverted hooks.

In some examples, the projections 912 may be configured in vertically offset columns of alternating hooks and inverted hooks.

A plurality of mounting sheets 915 may be stacked and/or positioned adjacent to each other to provide additional lateral support and/or retention of the tube assembly. For example, the tube 130 may be positioned and/or supported between two adjacent mounting sheets 915. In some examples, a first portion of projections 912 may be configured to project out of a first side of mounting sheet 915 to support a first column of tubes, and a second portion of projections 912 may be configured to project out of a second side of mounting sheet 915 to support a second column of tubes. In some examples, projection 912 may wrap more than 180 degrees around the tube 130.

Figure 21A:
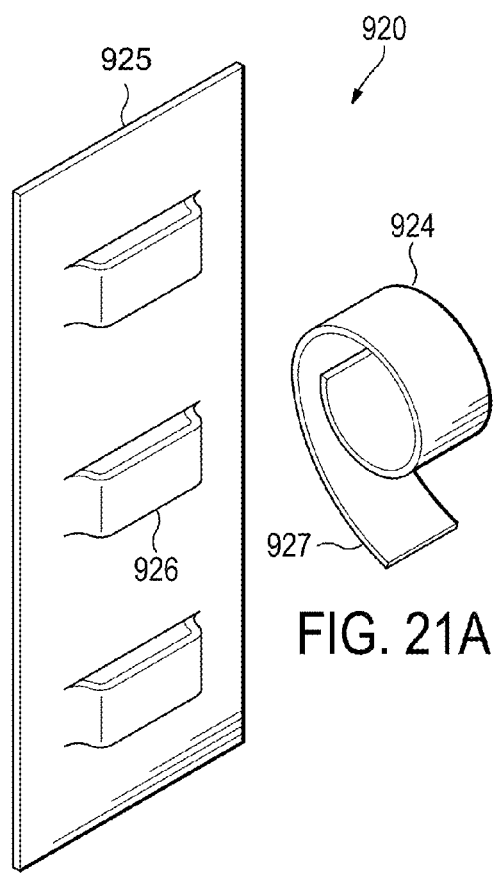
FIG. 21A illustrates an example tube support comprising a mounting sheet and a collar.

FIG. 21A illustrates an example tube support 920 comprising a mounting sheet 925 and a collar 924. The mounting sheet 925 may comprise a plurality of projections 926. The projections 926 may be shaped as one or more slots configured to receive collar 924. The collar 924 may be configured to circumferentially support a tube. In some examples, a plurality of projections and/or collars may be configured in columns and/or rows.

Figure 21B:
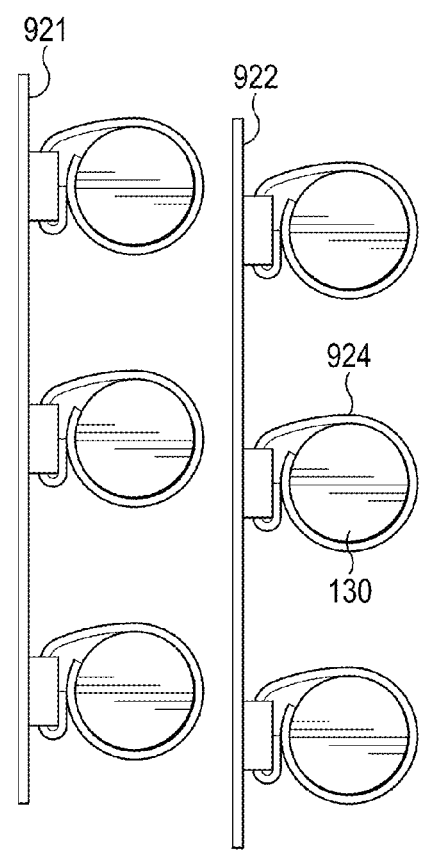
FIG. 21B illustrates a plurality of mounting sheets positioned adjacent to each other.

FIG. 21B illustrates a plurality of mounting sheets 921, 922, similar to mounting sheet 925 of FIG. 21A, shown stacked and/or positioned adjacent to each other to provide additional lateral support and/or retention of the tube assembly, including tube 130.

Collar 924 may be configured to be slidably attached to tube 130. Additionally, collar 924 may comprise an extending pin 927 (FIG. 21A) configured to slide into a slot formed behind projection 926. Once in place, the bottom of the pin 927 may be bent up around the slot and/or mounting sheet 925 to secure collar 924 within projection 926. One or more openings of collar 924 may be flared to prevent the edges from cutting into the tube 130.

In some examples, a first portion of projections 926 may be configured to project out of a first side of mounting sheet 925 to support a first column of tubes, and a second portion of projections 926 may be configured to project out of a second side of mounting sheet 925 to support a second column of tubes.

Figure 22A:
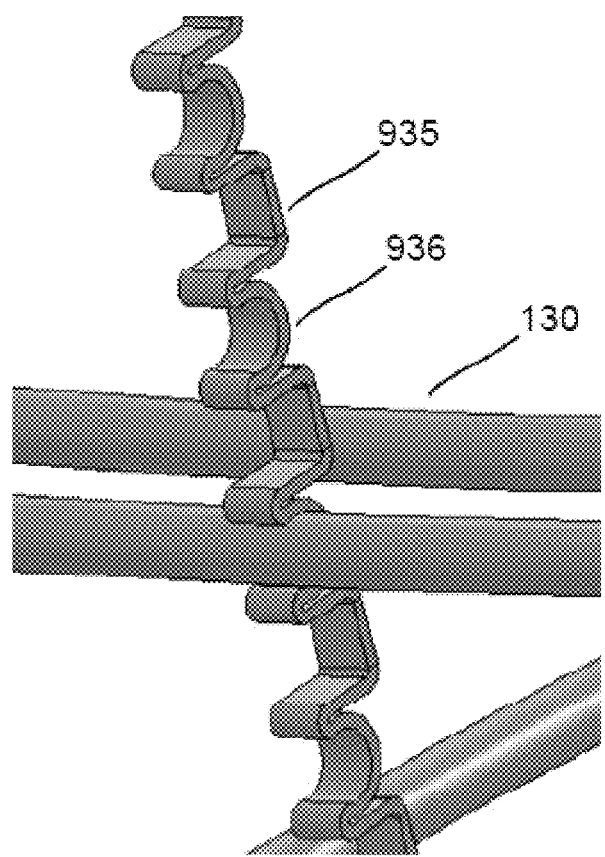
FIG. 22A illustrates an example tube support comprising a mounting sheet.

FIG. 22A illustrates an example tube support 930 comprising a mounting sheet 935. The mounting sheet 935 may comprise a plurality of projections 936 configured to support one or more tubes 130. The projections 936 may be configured as one or more clips.

Figure 22B:
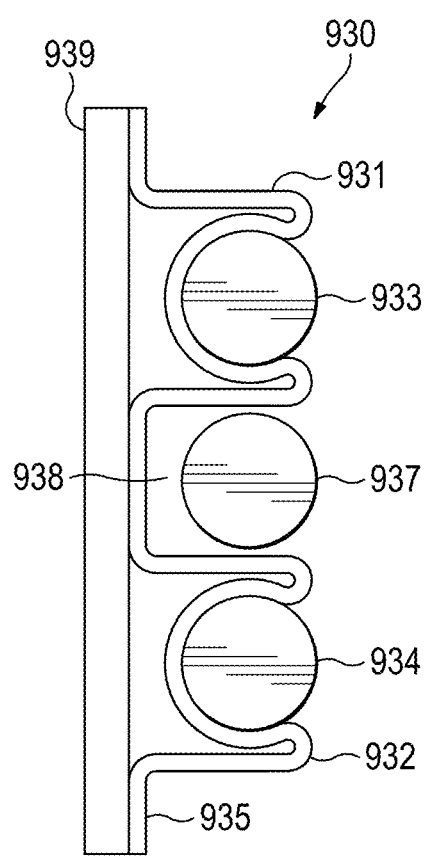
FIG. 22B illustrates a side view of the tube support of FIG. 22A.

FIG. 22B illustrates a side view of tube support 930 of FIG. 22A. Mounting sheet 935 may be located intermediate and/or adjacent to a backing 939. The backing 939 may be configured to provide additional lateral support of the projections. Mounting sheet 935 may comprise a first projection 931 and a second projection 932. A first tube 933 is illustrated as passing through and/or being supported by first projection 931, and a second tube 934 is illustrated as passing through and/or being supported by second projection 932. In some examples, a third tube 937 may be positioned and/or supported intermediate first projection 931 and second projection 932. For example, a space 938 may be provided between first projection 931 and second projection 932 to accommodate an intermediate tube, such as third tube 937.

A plurality of mounting sheets, such as mounting sheet 935, may be stacked and/or positioned adjacent to each other to provide additional lateral support and/or retention of the tube assembly. For example, the tube 130 may be positioned and/or supported between two adjacent mounting sheets. In some examples, a first portion of projections 936 may be configured to project out of a first side of a mounting sheet to support a first column of tubes, and a second portion of projections 936 may be configured to project out of a second side of the mounting sheet to support a second column of tubes.

Mounting sheet 935 may be formed as an accordion shaped array of semi-circular projections configured to clip around tube 130. Backing 939 may comprise a straight metal sheet that is configured to prevent the mounting sheet 935 from losing its shape under vertical loading. Backing 939 may be spot welded to mounting sheet 935 at the portion of the sheet behind space 938. Projections 936 may be located at every other tube location, and in some examples, two mounting sheets may be combined to make a single support bar. Tube support 930 may be configured as a floating support.

Figures 23A, 23B:
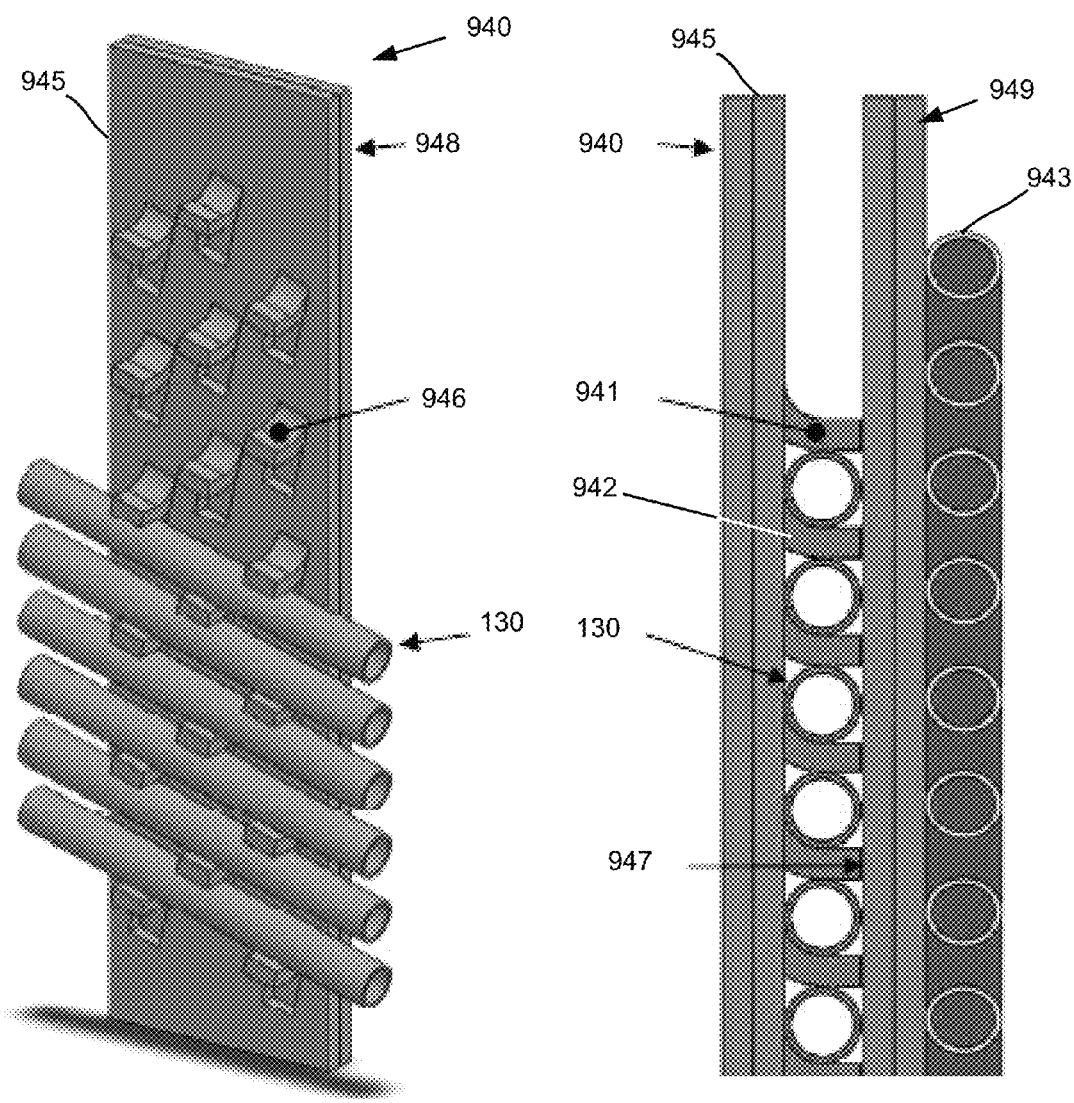
FIG. 23A illustrates an example tube support comprising a mounting sheet and a plurality of projections.
FIG. 23B illustrates a plurality of tube supports with backing plates positioned adjacent to each other.

FIG. 23A illustrates an example tube support 940 comprising a mounting sheet 945 and a plurality of projections 946 shaped as tabs. Projections 946 may be formed by stamping curved 'L' shapes out of mounting sheet 945. One or more tubes 130 may slide into a slot formed by tabs on both sides of the tube 139. The thickness of mounting sheet 945 and/or of projections 946 may be configured to provide a perpendicular gap or spacing between the tubes. Additionally, Projections 946 may be configured to provide upper and lower support for the tube 130. Projections 946 may be arranged in a staggered manner. Mounting sheet may comprise three columns of projections to provide a stronger moment constraint, e.g., to prevent the tube from being able to pivot around the first two columns. A backing plate 948 may be welded onto the back of mounting sheet 945 to provide strength and the appropriate radial gap between adjacent columns of tubes.

FIG. 23B illustrates a plurality of tube supports, including tube support 940 and an adjacent tube support 949, shown stacked and/or positioned adjacent to each other to provide additional lateral support and/or retention of a first column of tubes, including tube 130. Adjacent tube support 949 may comprise a mounting sheet, a backing plate, and/or a plurality of projections for supporting a second column of tubes 943, similar to that described with respect to tube support 940 and illustrated in FIG. 23A. The first column of tubes supported by mounting sheet 945 may be separated from the second column of tubes 943 by a distance which is approximately equal to the thickness of adjacent tube support 949. In some examples, the thickness of adjacent tube support 949 may equal a combined thickness of a mounting sheet and a backing plate.

The position of the tube 130 may be vertically constrained by an upper projection 941 and a lower projection 942 of mounting sheet 945. The projections of tube support 945 may be configured to form a contact point 947 at the back of the adjacent tube support 949, effectively transmitting lateral seismic loads between tube supports. Additionally, the position of tube 130 may be laterally constrained between mounting sheet 945 of tube support 940 and the back of the adjacent tube support 949.

Figures 24A, 24B:
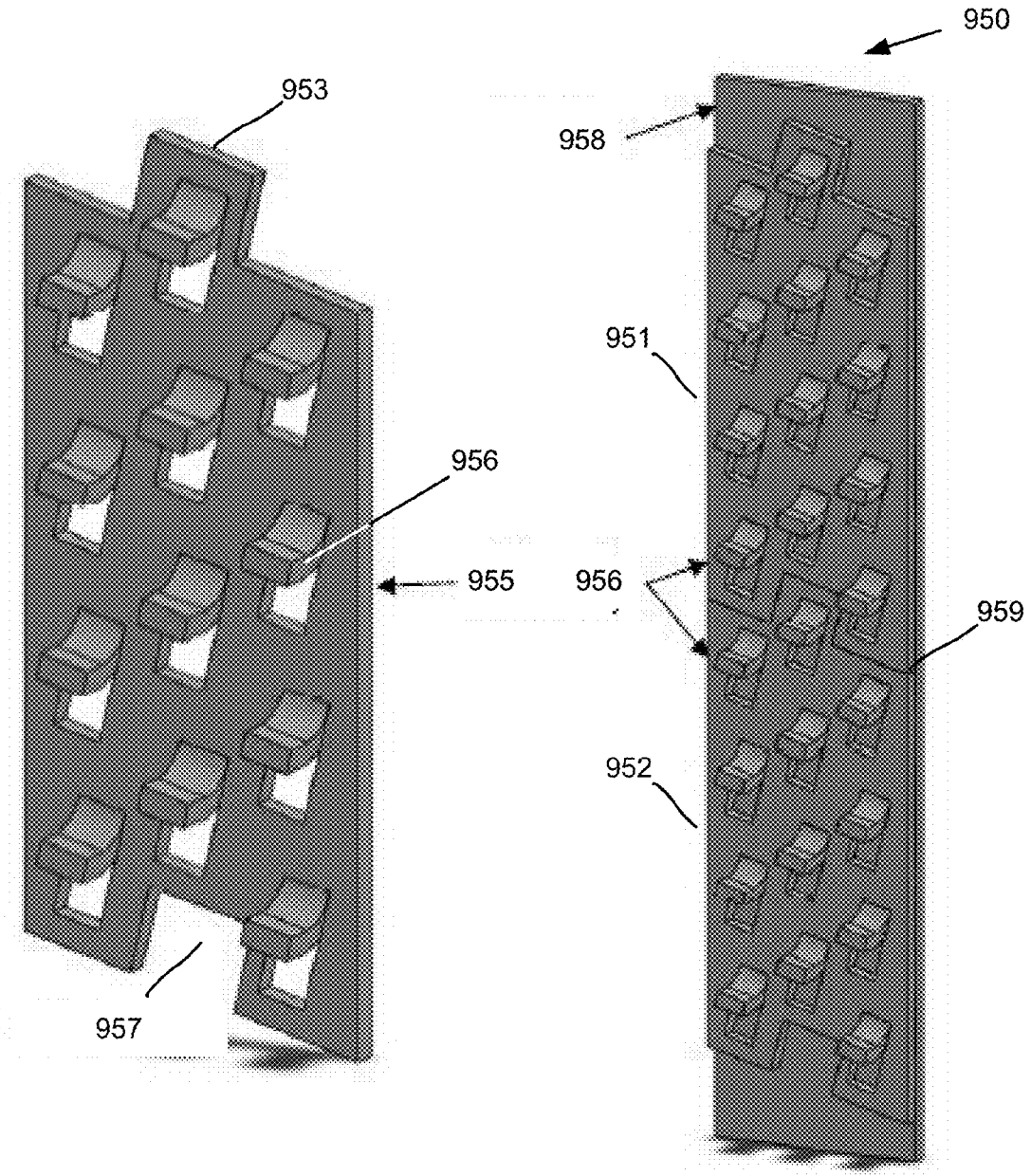
FIG. 24A illustrates an example mounting sheet comprising a plurality of projections.
FIG. 24B illustrates a tube support comprising a plurality of mounting sheets.

FIG. 24A illustrates an example mounting sheet 955 comprising a plurality of projections 956, similar to projections 946 of FIG. 23A. Mounting sheet 955 may comprise a mounting tab 953 and a mounting slot 957. The width of mounting tab 953 may be approximately the same, or slightly smaller than, the width of mounting slot 957.

FIG. 24B illustrates a tube support 950 comprising a plurality of mounting sheets, including a first mounting sheet 951 and a second mounting sheet 952. Each of mounting sheets 951, 952 may comprise a plurality of projections, such as projection 956. One or both of mounting sheets 951, 952 may comprise a mounting tab, such as mounting tab 953 of FIG. 24A, and/or a mounting slot, such as mounting slot 957 of FIG. 24A. In some examples, a mounting tab associated with second mounting sheet 952 may be configured to fit within a mounting slot associated with first mounting sheet 951 to form a mounting connection 959. Additionally, tube support 950 may comprise a backing plate 958. Backing plate 958 may comprise a single plate that is welded and/or otherwise attached to both mounting sheets 951, 952.

Assembling tube support 950 with a plurality of mounting sheets 951, 952 may allow for smaller segments to be cut and then assembled later, whether to facilitate manufacturing or assembly of tube support 950. For example, backing plate 958 may be manufactured to be of sufficient height to extend vertically through the entire steam generator tube bundle, whereas the plurality of mounting sheets may have a combined total assembled height which approximates the height of the backing plate 958.

Figures 25A, 25B:
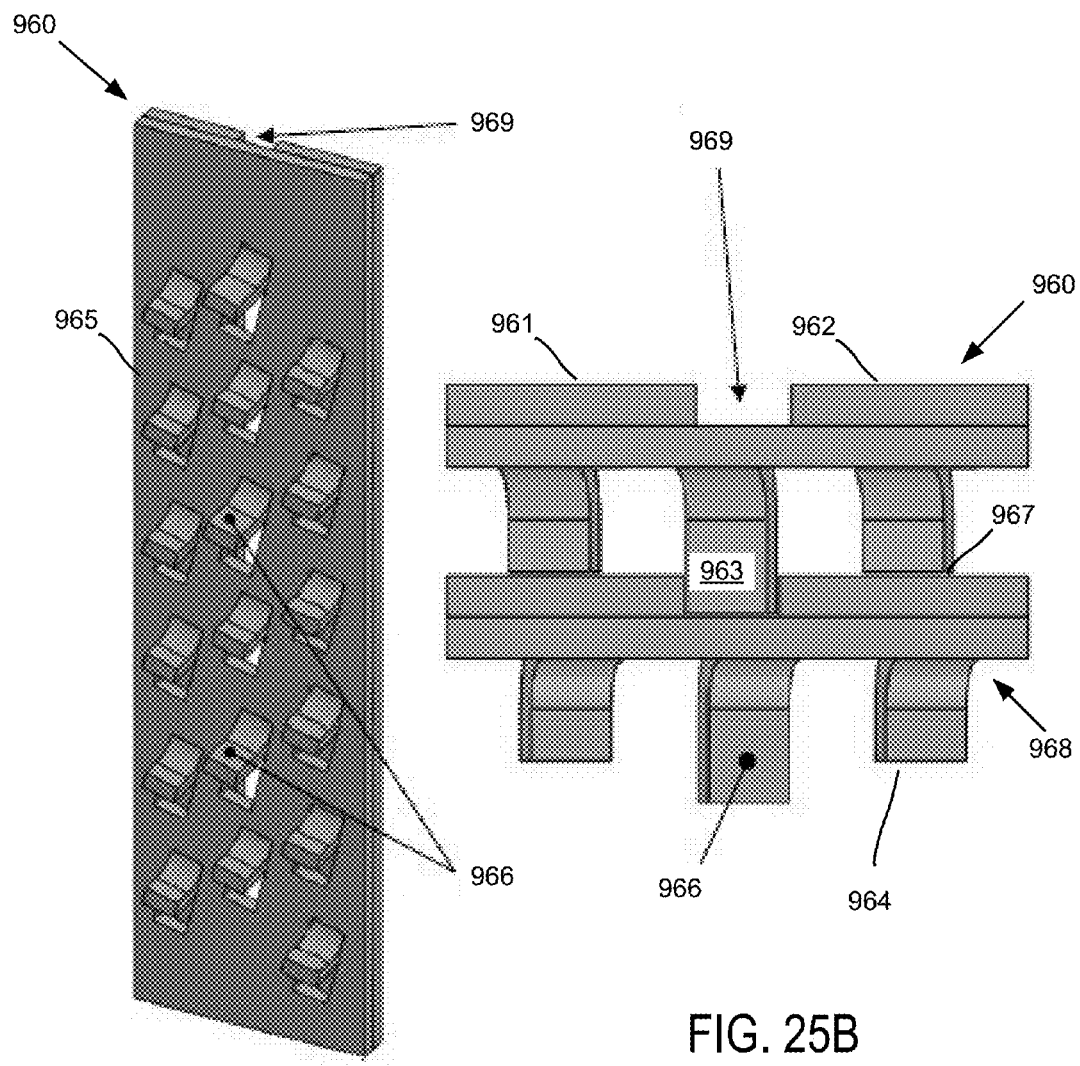
FIG. 25A illustrates yet a further example tube support comprising a mounting sheet.
FIG. 25B illustrates a top view of a plurality of tube supports positioned adjacent to each other.

FIG. 25A illustrates yet a further example tube support 960 comprising a mounting sheet 965. Mounting sheet 965 may comprise a plurality of projections configured to support the tube assembly. The plurality of projections may be arranged as offset or staggered columns of projections, similar to that described and illustrated in FIG. 23A. In some examples, one or more columns such as a middle column of mounting sheet 965 may comprise extended projections 966 with an extended length tab. Additionally, tube support 960 may comprise an alignment track 969 formed on a backside of mounting sheet 965.

FIG. 25B illustrates a top view of a plurality of tube supports, including tube support 960 and an adjacent tube support 968, shown stacked and/or positioned adjacent to each other to provide additional lateral support and/or retention of a tube assembly. Adjacent tube support 968 may comprise a mounting sheet, a backing plate, and/or a plurality of projections for supporting a second column of tubes, similar to that described and illustrated in FIG. 23B. Alignment track 969 may be formed between two parallel backing plates 961, 962 welded to and/or otherwise attached to a back of tube support 960. In other examples, alignment track 969 may be formed by cutting a slot in a single backing plate.

To keep tube support 960 aligned with adjacent tube support 968, extended projection 966 may be configured to fit into an alignment track of the adjacent tube support 68, similar to track 969, to form a mounting connection 963. Additionally, one or more outer projections, similar to projections 964, may be configured to form a contact point 967 at the back of the adjacent tube support 969, effectively transmitting lateral seismic loads between tube supports. Tube support 960 and/or adjacent tube support 968 may be supported in tracks and/or bumpers located on the outside of the riser and/or on the inside of the RPV.

Figure 26:
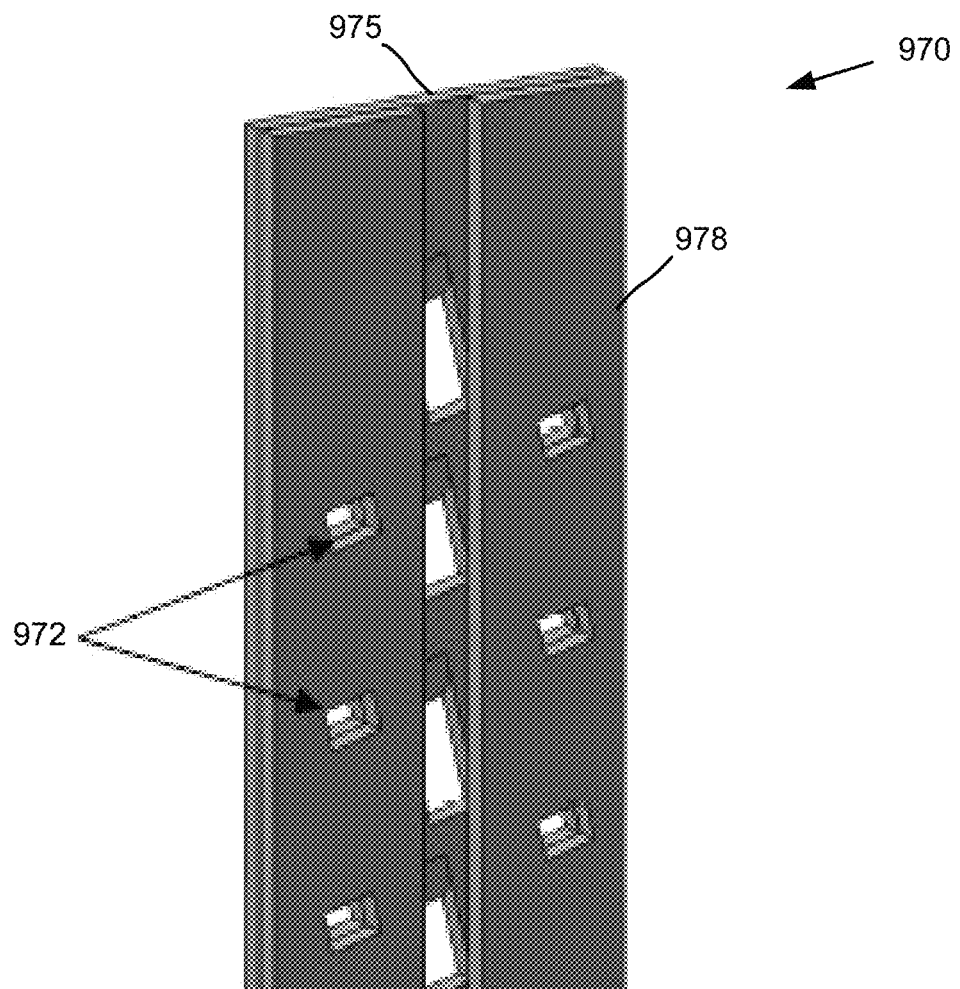
FIG. 26 illustrates an example tube support comprising a mounting sheet with through-holes.

FIG. 26 illustrates an example tube support 970 comprising a mounting sheet 975 with through-holes 972 located in a backing plate 978. Through-holes 972 may be aligned behind one or more projections in mounting sheet 975, such as projections 964 of FIG. 25B. In some examples, the projections may be stamped out of the mounting sheet 975 leaving a plurality of punched holes. The punched holes in mounting sheet 975 may be configured to align with the through-holes 972 to provide passageways through both the mounting sheet 975 and the backing plate 978.

Backing plate 978 may comprise one or more plates, similar to that described at FIG. 25B. Through-holes 972 may be configured to allow primary coolant to flow through both the mounting sheet 975 and the backing plate 978 and reduce the potential for deposit buildup and/or corrosion products that might otherwise become trapped in a pocket formed between the projections of mounting sheet 975 and backing plate 978. Additionally, the edges of the through-holes 972 may be beveled to allow for corrosion products to be more easily flushed out.

In any of the various example mounting sheets illustrated in FIGS. 19-26, one or more dies may be used repeatedly to mass produce the corresponding projections. In some examples, adjacent mounting sheets and or columns of tubes may be radially connected to each other. One or more of the projections may be configured to provide positive clamping of the tubes. In some examples, one or more of the mounting sheets may be reinforced with metal bars and/or additional sheets.

Figure 27:
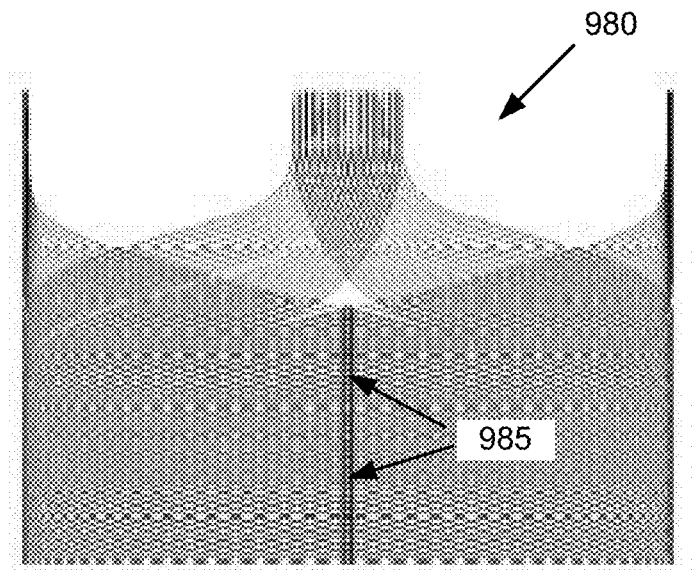
FIG. 27 illustrates an example tube support assembly comprising a plurality of vertical floating supports.

FIG. 27 illustrates an example tube support assembly 980 comprising a plurality of vertical floating supports 985 in a tube bundle. Vertical floating support 985 may run vertically between the feed plenum and the steam plenum above it.

Figure 28:
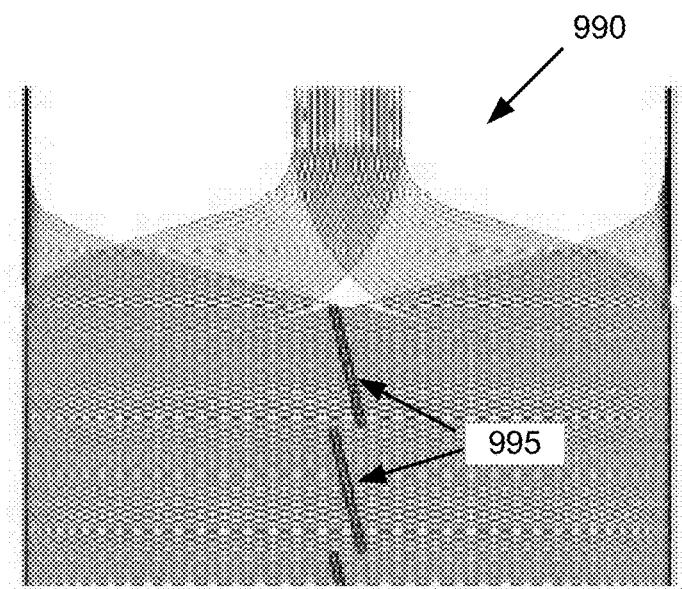
FIG. 28 illustrates an example tube support assembly comprising angled floating supports.

FIG. 28 illustrates an example tube support assembly 990 comprising angled floating supports 995 in a tube bundle. Angled floating supports 995 may be broken up into segments and run perpendicular to the tubes.

In some examples, floating supports may be configured to connect the tubes to each other, but the tube support assembly may not be attached to a structure, such as top and bottom beams and/or cantilevers, located outside of the steam generator. Floating supports may be configured to stiffen the tube bundle, which increases the natural frequencies of the tubes and reduces flow induced vibration concerns. Additionally, since floating supports do not need to attach to any structures external to the steam generator, and accordingly may not extend outside of the tube bundle, they can be placed at almost any location.

In some examples, the same type of tube support assembly may be used on all columns of tubes, for example if the tubes have a constant perpendicular pitch. One or more of the tube support assemblies 980, 990 may comprise a vertical floating support 985, as illustrated in FIG. 27 and/or an angled floating support 995, as illustrated in FIG. 28.

Figure 29A:
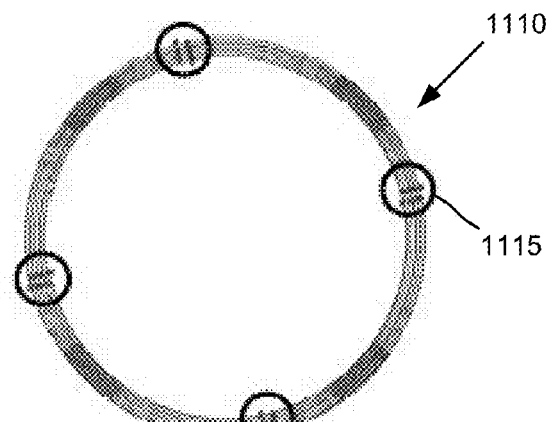
FIG. 29A illustrates an example tube support assembly configured with four fixed supports.
Figure 29B:
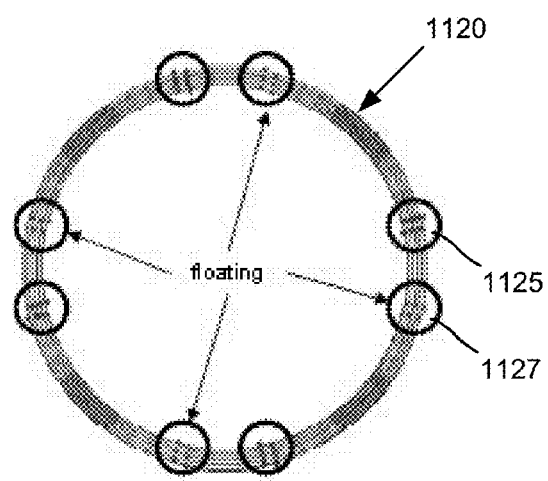
FIG. 29B illustrates an example tube support assembly configured with four fixed supports and four floating supports.
Figure 29C:
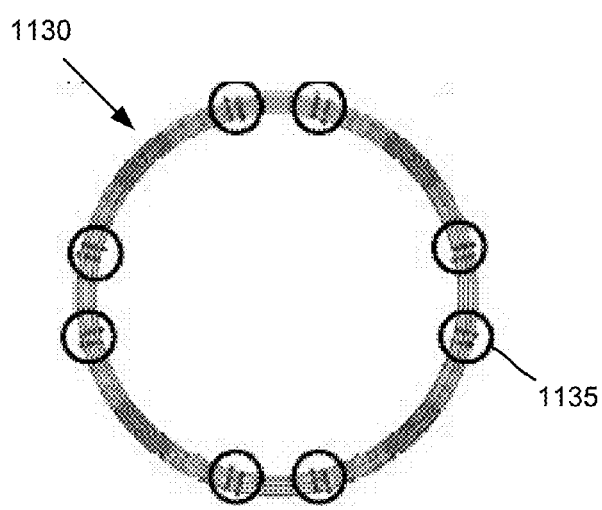
FIG. 29C illustrates an example tube support assembly configured with eight fixed supports.

FIG. 29A illustrates an example tube support assembly 1110 configured with four fixed supports 1115 that are equally spaced from each other. FIG. 29B illustrates an example tube support assembly 1120 configured with four fixed supports 1125 and four floating supports 1127. FIG. 29C illustrates an example tube support assembly 1130 configured with eight fixed supports 1135 that are not equally spaced from each other, however, in some examples, the supports 1135 may be equally spaced from each other about the steam generator tube assembly.

The tube support assemblies illustrated in FIGS. 27, 28, 29A, 29B, and/or 29C may comprise one or more tube support assemblies various described herein. For example, the tube support assembly may comprise a sheet or bar having a thickness, and one or more projections or tabs projecting from a surface of the sheet/bar. The projections/tabs may be configured to support a column of tubes of the steam generator system. Two or more of the projections/tabs may be configured to contact a single tube, and adjacent tubes in the column of tubes may be separated from each other by a distance equal to or greater than the thickness of the sheet. In some examples, adjacent tubes in the column of tubes may be separated from each other by a thickness of the projections/tabs. Additionally, the sheet/bar may be attached to an upper beam located at an upper end of the steam generator system by a fixed or pinned support, and the sheet/bar may be attached to a lower beam located at a lower end of the steam generator system by a fixe, pinned, or floating support.

The tube support assembly may comprise a number of sets of sheets, bars, or other types of support structures radially located around the steam generator system. For example, there may be four to eight sets of support structures as illustrated in FIGS. 12A-C. Each of the sets of support structures may include tabs configured to support the column of tubes. In some examples, four of the eight sets of support structures may comprise fixed supports, and another four sets of sheets may comprise floating supports. The fixed supports may be circumferentially located in between each of the floating supports.

Figure 30:
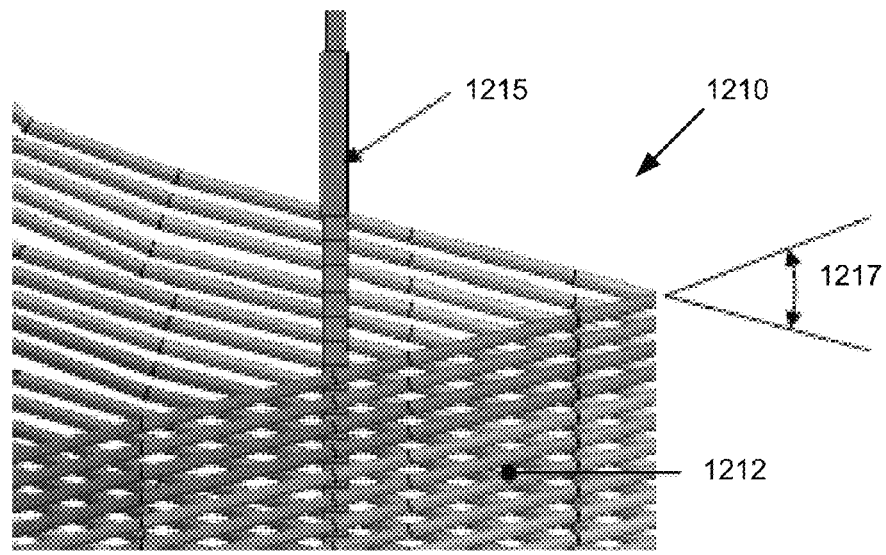
FIG. 30 illustrates an example tube support assembly positioned among helical tubes.

FIG. 30 illustrates an example tube support 1215 and two successive columns of tubes arranged with a relative crossing angle 1217. In some examples, a tube support 1215 may comprise a floating tube support configured to support one or more tube columns with a tube crossing angle 1217. In some examples, tube crossing configuration 1212 may be configured to provide the only circumferential restraint on tube support 1215. In some examples, tube support crossing assembly 1210 may comprise an alignment device to prevent relatively sliding between tube supports. Additionally, one or more tubes supports may be connected together in a radial connection through the steam generator tube bundle.

A radial connection may be configured to stiffen the support structure, and thereby increase the natural frequencies of the steam generator tube bundle. The radial connection may also be configured to align the tube supports.

The circumferential deflections in the steam generator tube support assemblies may be reduced by having the inner and outer tube supports rest in bumpers or tracks that are welded to the riser and/or RPV. Additionally, the tube supports may be configured to engage each other in the circumferential direction. Stresses on the tubes may be reduced by using in-line supports that provide a load path through the supports only, instead of staggered supports which transmit loads through the tubes.

Figure 31:
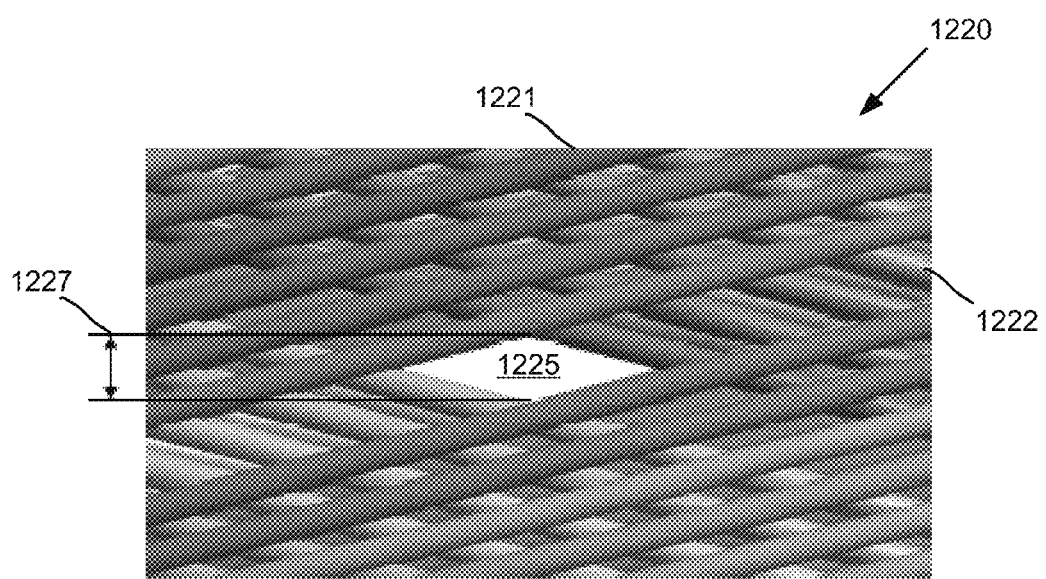
FIG. 31 illustrates an example radial path through a helically tubed heat exchanger.

FIG. 31 illustrates a radial path 1225 that may be created by the removal of a number of tubes to make a gap 1227 (or space) for one or more radial connections of tube supports through the tube bundle.

Figure 32:
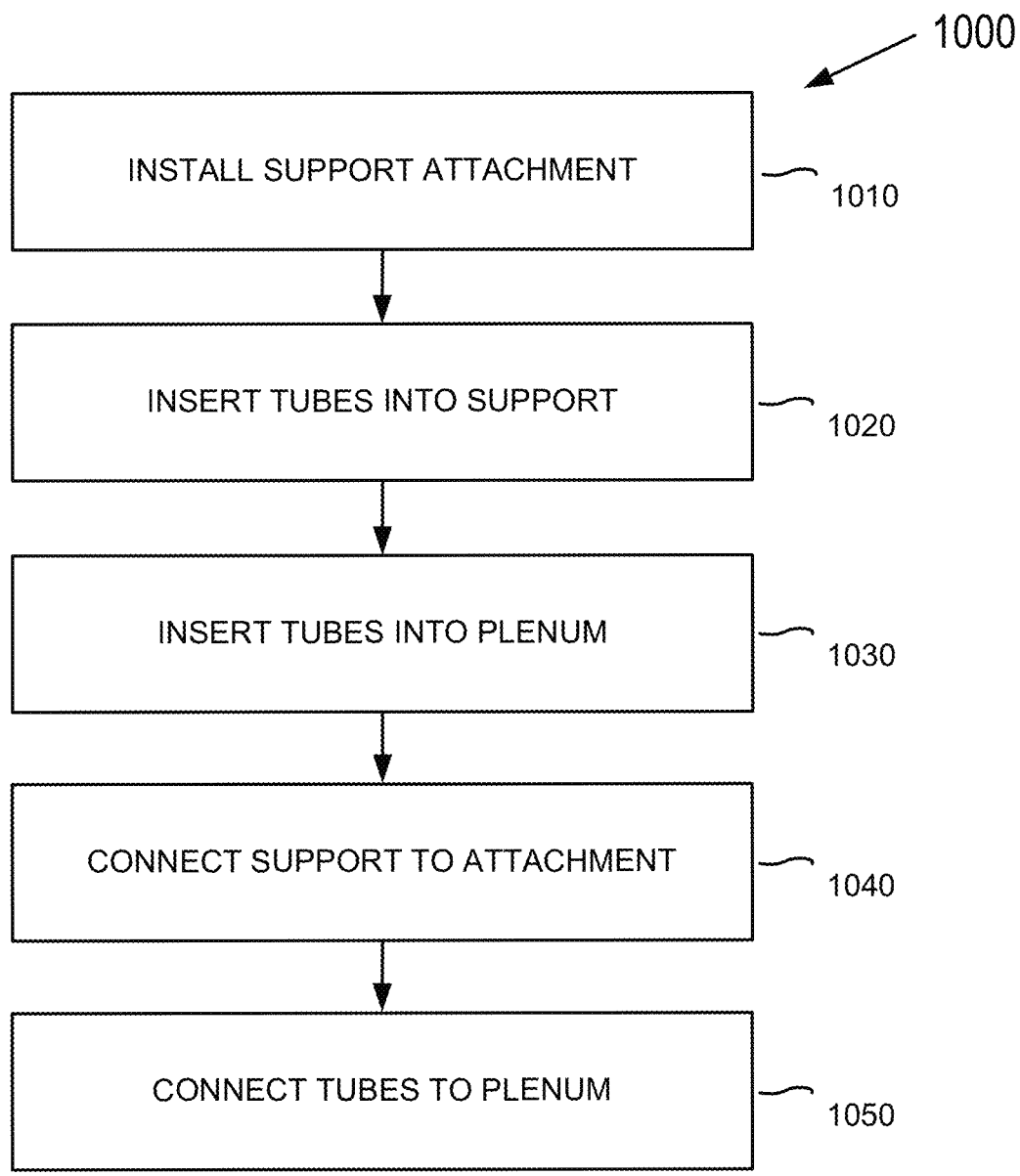
FIG. 32 illustrates an example process assembling helical tubes and tube support assemblies.

FIG. 32 illustrates an example process 1000 of supporting a tube assembly. At operation 1010, a support attachment may be installed. For example, the support attachment may be installed to a reactor core column, riser, vessel, other types of structure, or any combination thereof. The support attachment may include a bar, a fastening device, a backing, other types of attachment, or any combination thereof.

At operation 1020, a number of tubes, such as steam generator tubes, may be inserted into a plurality of tube supports. The tube supports may be configured to connect, clip, surround, hold, support, and/or receive the number of tubes.

At operation 1030, an end of the tubes may be inserted into a plenum. In some examples, a first end of the tubes may be inserted into a first plenum and a second end of the tubes may be inserted into a second plenum.

At operation 1040, the plurality of tube supports may be connected to the support attachment. For example, after the number of tubes have been inserted into the plurality of tube supports and also inserted into the plenum, the tube supports may be connected and/or welded to the support attachments. In some examples, the tube supports may be connected and/or welded to the support attachments prior to inserting the tubes into one or more of the plenums.

At operation 1050, the number of tubes may be connected to the plenum. In some examples, the tubes may initially be inserted loosely into the plenum while the tube supports are connected to the support attachment, and then the tubes may be connected and/or welded to a tube sheet within the plenum once the tubes and/or tube supports have been finally positioned relative to the support attachment. In other examples, the tubes may be connected to the plenum prior to connecting the tube supports to the support attachment.

The tubes may undergo a plurality of motions or operations as part of process 1000. For example, an end point of the tube may be pushed radially inward so it can fit inside the RPV, prior to being positioned against its corresponding hole in the tube sheet. Additionally, the end of the tube may be rotated so it is co-linear with the tube sheet hole, and then the tube may be pushed into the tube sheet. Whereas in some examples the tube supports may already be in place when the tube is being installed, in other examples the tubes may be installed first, and then the tube supports may be added later. Pre-installing the tubes may allow the tubes to deform more freely inside the SG bundle, and reduce the amount of plastic deformation.

Multiple thousands of tube supports may be used to support the entire steam generator tube assembly. In some examples, approximately 40,000 tube supports may be utilized together to support the tube assembly. One or more of the example tube supports may be mounted to one or more components illustrated in FIG. 1, such as the riser 24, the reactor vessel 2, and/or other appropriate structure.

Figure 33A:
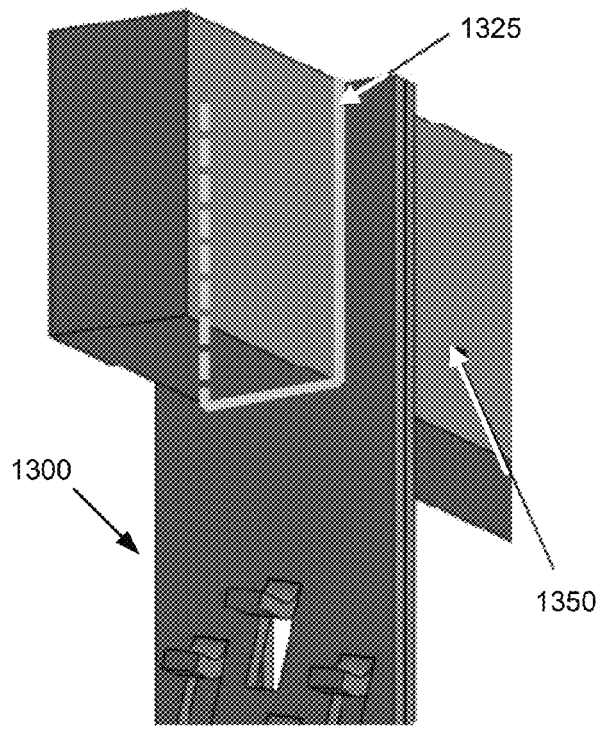
FIGS. 33A and 33B illustrate front and back views of an example steam generator tube support assembly mounted to a support beam.
Figure 33B:
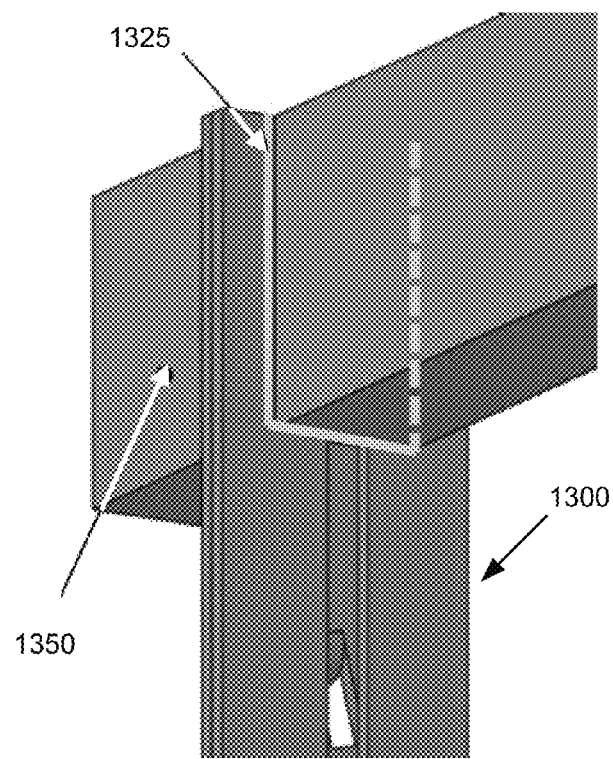

FIGS. 33A and 33B illustrate front and back views, respectively, of an example steam generator tube support assembly 1300 mounted or otherwise attached to a beam 1350. In some examples, beam 1350 may comprise an upper cantilever. A beam attachment 1325 may comprise a mounting bracket, joint, or welded area connecting a portion of generator tube support assembly 1300 to beam 1350. In some examples, steam generator tube support assembly 1300 may be welded about a perimeter of beam 1350, where beam 1350 intersects a mounting sheet and/or backing plate of steam generator tube support assembly 1300.

Figure 34:
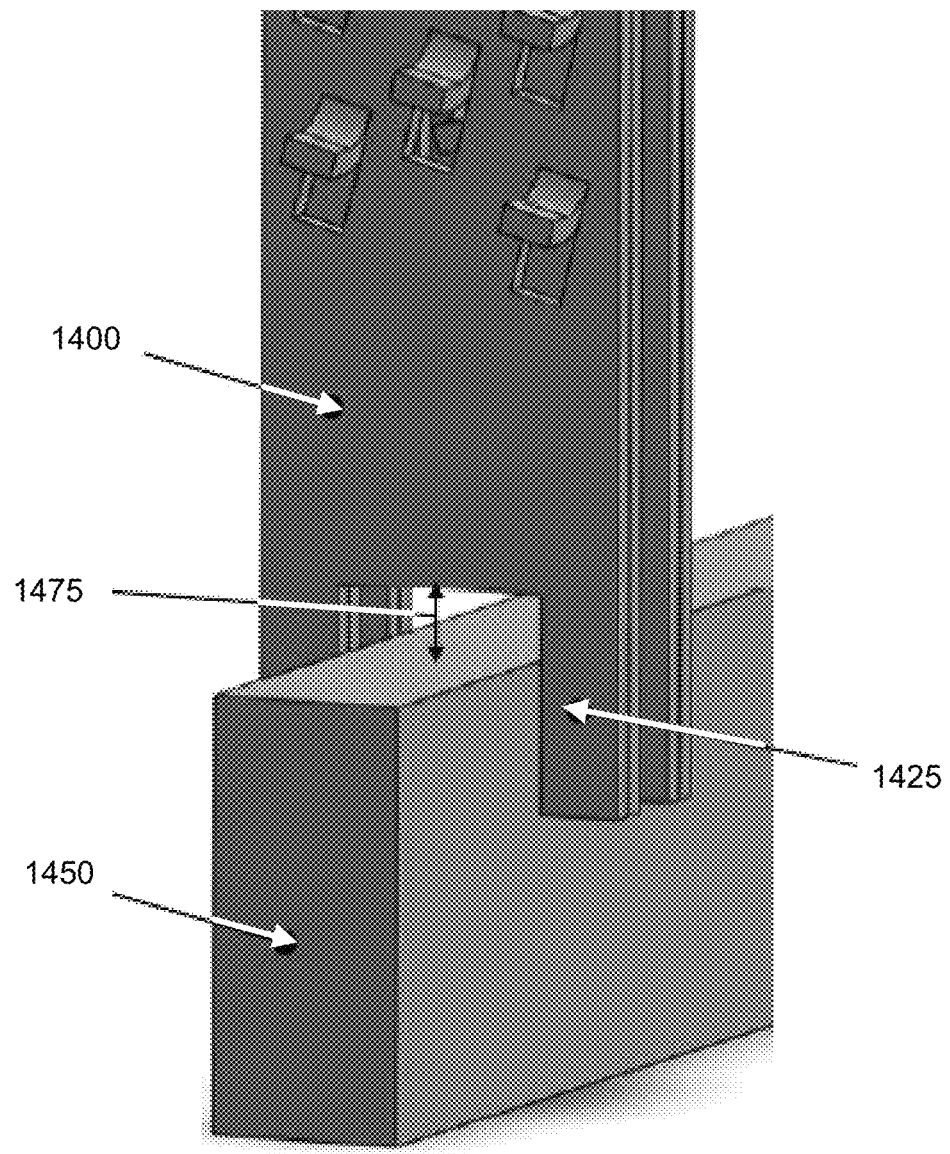
FIG. 34 illustrates an example steam generator tube support assembly mounted to a beam.

FIG. 34 illustrates an example steam generator tube support assembly 1400 mounted or otherwise attached to a beam 1450. In some examples, beam 1450 may comprise a lower beam. A beam attachment 1425 may comprise a mounting bracket, joint, or a welded area connecting a portion of steam generator tube support assembly 1400 to beam 1450.

Beam attachment 1425 may comprise a relatively loose fitting connection point, allowing steam generator tube support assembly 1400 to move or float relative to beam 1450. For example, the lower end of steam generator tube support assembly 1400 may be allowed to move towards beam 1450 some distance within a gap 1475 formed between the two structures. Additionally, steam generator tube support assembly 1400 may be allowed to move along the length of beam 1450, with beam 1450 forming a type of track or rail along which beam attachment 1425 may slide.

Lateral restraint of steam generator tube support assembly 1400 may be provided by beam attachment 1425, and radial restraint of steam generator tube support assembly 1400 may be provided by contact with the adjacent supports, RPV, and/or riser. In some examples, additional radial restraint features may be added to lower beam 1450 to aid in steam generator tube assembly. The top surface of lower beam 1450 may be beveled to reduce the potential for corrosion products to build up.

In some examples, a lower portion of a tube support may comprise steam generator tube support assembly 1400, and an upper portion of the tube support may comprise steam generator tube support assembly 1300 (FIG. 33). The tube support may be welded to the upper beam and connected to a lower beam with a guided floating support. A floating lower support may be configured to relieve the thermal stresses due to differential thermal expansion between the support bars and the RPV. Additionally, a pinned connection at the top of the tube support may be configured to reduce stresses near the joint.

Figure 35:
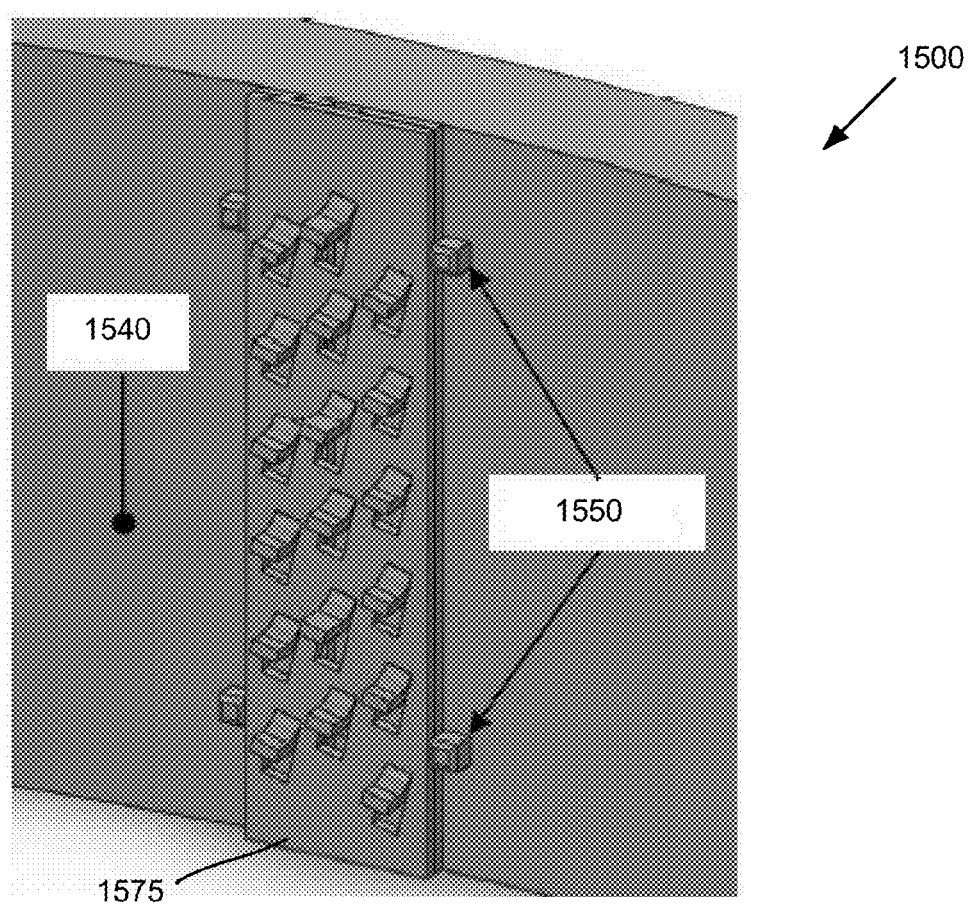
FIG. 35 illustrates an example steam generator tube support assembly comprising bumpers.

FIG. 35 illustrates an example steam generator tube support assembly 1500 comprising bumpers 1550. The bumpers may be attached outside of a riser and inside of a reactor pressure vessel 1540 to restrain movement of a tube support sheet 1575 in the circumferential direction.

Figure 36:
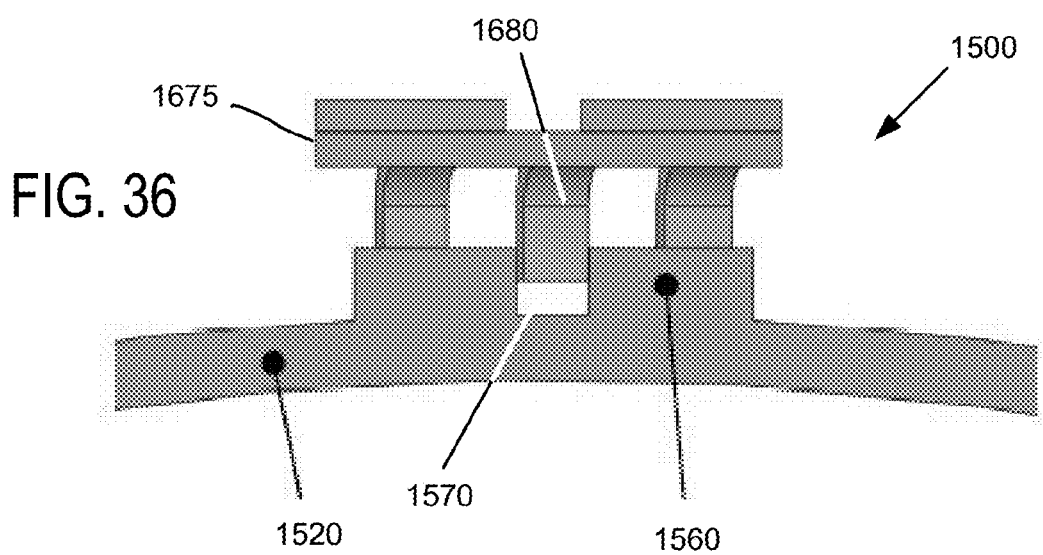
FIG. 36 illustrates a top view of the example steam generator tube support assembly comprising a track.

FIG. 36 illustrates a top view of the example steam generator tube support assembly 1500 of FIG. 35 comprising a track 1560 on the outside of a riser 1520. In some examples, tube support sheet 1675 may be configured with a projection 1680 configured to fit into a gap 1570 formed by track 1560. The track 1560 may be configured to provide circumferential restraint for a tube support sheet 1675 and/or an inner column of tubes. The bumpers 1550 and track 1560 illustrated in FIGS. 35 and 36 may be configured to circumferentially restrain inner and outer supports respectively.

Figure 37:
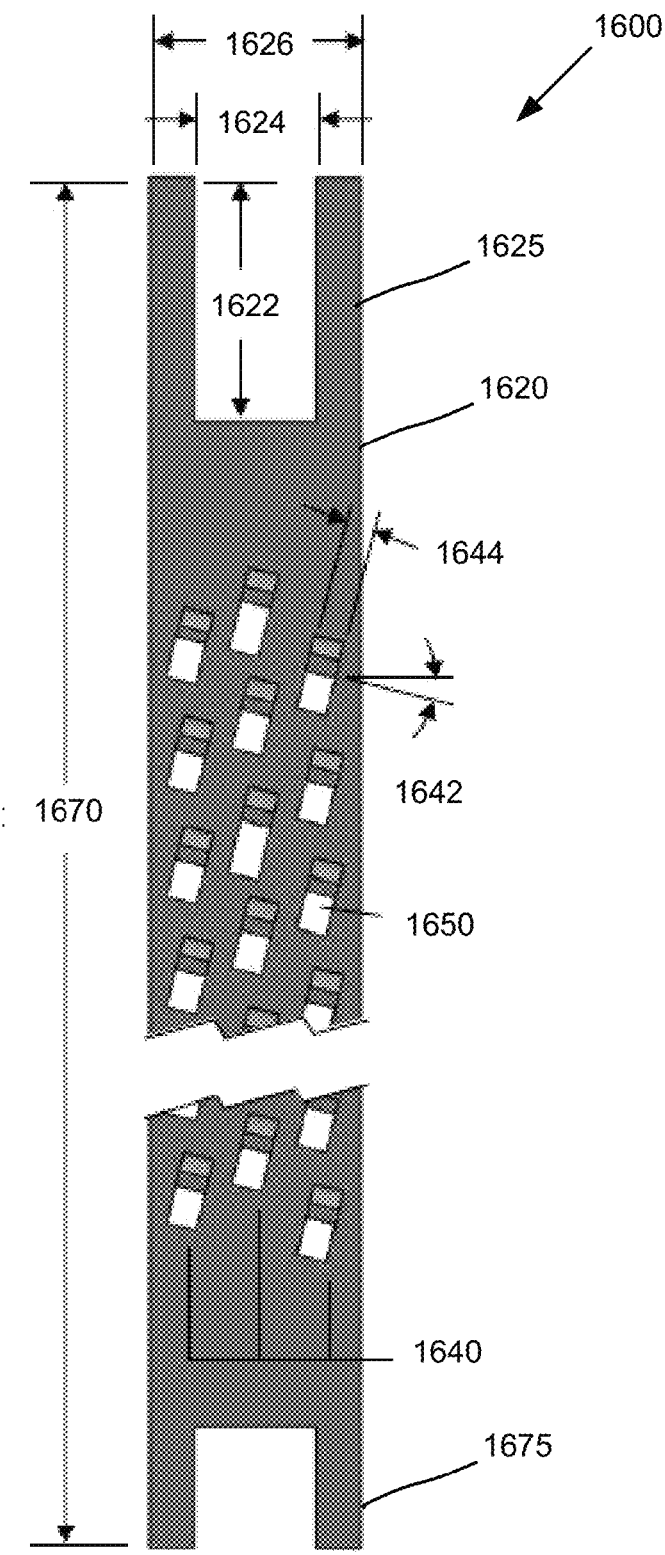
FIG. 37 illustrates an example tube support assembly comprising a tube mounting sheet having projections arranged in an angled orientation.

FIG. 37 illustrates an example tube support assembly 1600 comprising a tube mounting sheet 1620 having projections 1640 arranged in an angled orientation. Projections 1640 may be stamped out of tube mounting sheet 1620 leaving one or more through-holes 1650. In some examples, projections 1640 may be arranged as three or more columns of tabs having a width 1644. Each column of tabs may be oriented at the same angle 1642. Projections arranged at an angled orientation may be configured to support steam generator tubes arranged as a helical or angled bundle of tubes.

Tube support assembly 1600 may comprise an upper end 1625 and a lower end 1675. One or both of upper end 1625 and lower end 1675 may comprise an attachment area for mounting to a beam, for example. The attachment area may comprise a width 1624 and a length 1622 sized to receive the beam. In some examples, the width 1624 of the attachment area may be less than a width 1626 of the tube mounting sheet 1620. A length 1670 of tube support assembly 1600 may be approximately equal to the distance between lower and upper attachment beams.

Figure 38:
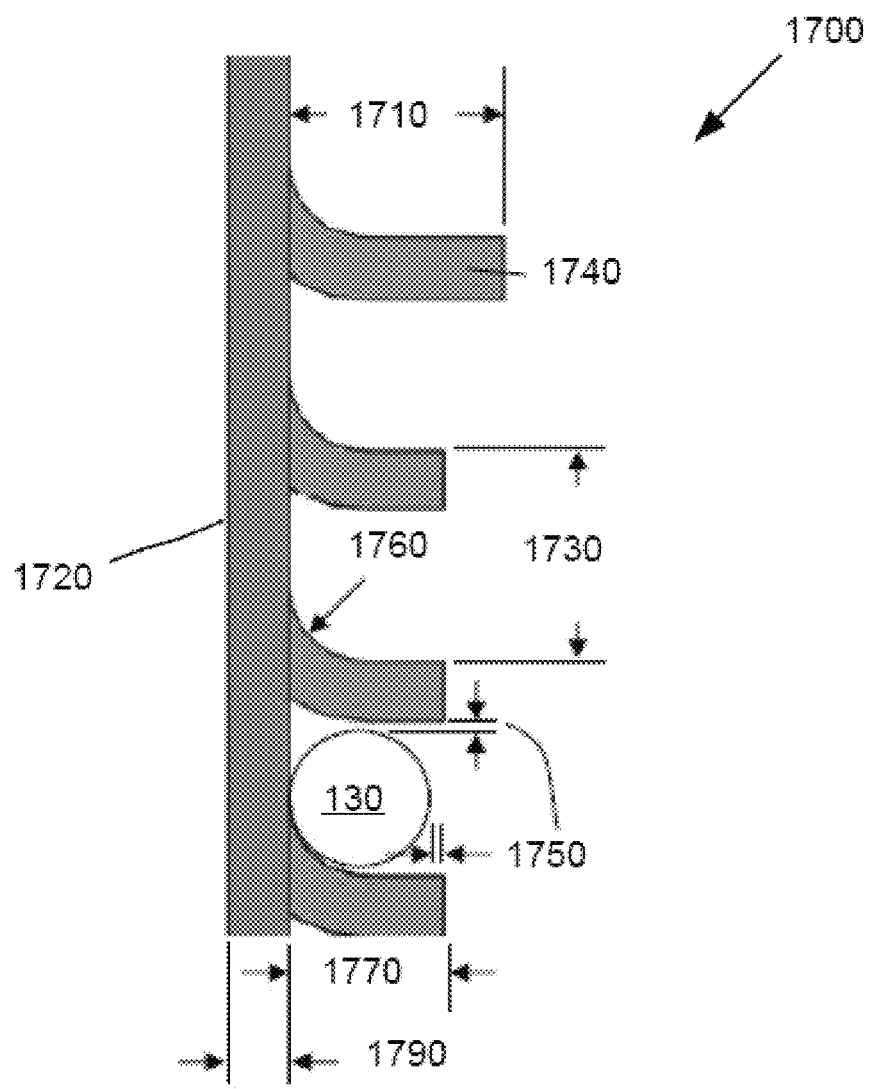
FIG. 38 illustrates a further example tube mounting assembly.

FIG. 38 illustrates an example tube mounting assembly 1700 comprising a tube mounting sheet 1720 and a plurality of tabs 1740. In some examples, every other tab along a column of tabs, such as a central column of tabs, may extend from the surface of tube mounting sheet 1720 by a distance 1710 which is greater than the distance 1770 associated with the adjacent tabs. In some examples, tabs 1740 may be stamped out of tube mounting sheet 1720 such that a thickness of each of the tabs 1740 is approximately equal to a thickness 1790 of the tube mounting sheet 1720.

Tabs 1740 may be spaced apart from each other by a distance 1730 which provides for a vertical tolerance 1750 between a tube 130 and two supporting tabs. In some examples, the length 1770 of the adjacent tabs may provide for a horizontal tolerance which is equal to the vertical tolerance 1750. The tabs may comprise a curvature 1760 which is configured to provide multiple or continuous points of contact with the tube 130 being supported thereon.

Figure 39:
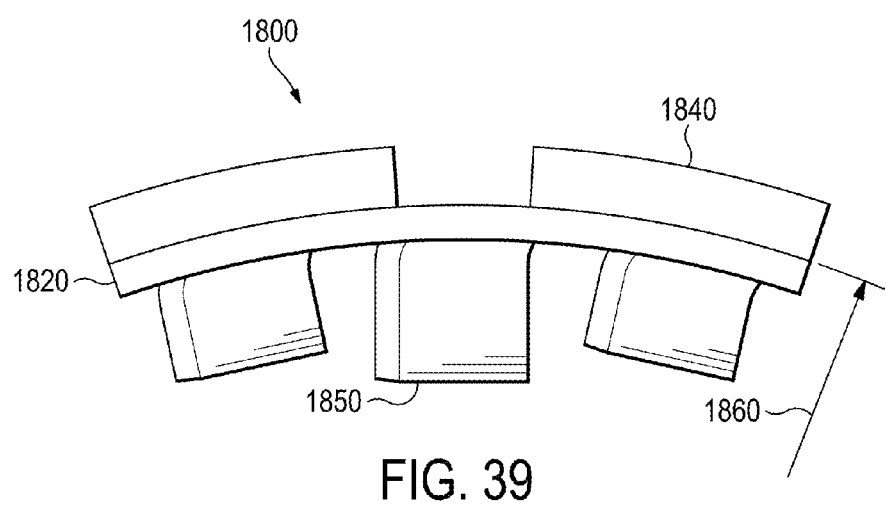
FIG. 39 illustrates an example tube mounting assembly configured with a radius of curvature.

FIG. 39 illustrates an example tube mounting assembly 1800 configured with a radius of curvature 1860. In some examples, tube mounting assembly 1800 may comprise a tube mounting sheet 1820 and one or more backing plates 1840 which are all formed with the radius of curvature 1860. The radius of curvature 1860 may allow for multiple or continuous points of contact between a tube and one or more projections 1850 that support the tube. The radius of curvature 1860 may be approximately equal to a radius of curvature associated with the tube, for example in a helical shaped steam generator tube bundle.

Whereas certain examples describe use of the helical coil steam generator in a nuclear reactor, the steam generator could also be made to operate with other types of steam generating power facilities, including gas powered and coal fired plants. Similarly, the steam generators may be configured to operate with either natural or forced circulation.

Although the examples provided herein may be described and/or compatible with a pressurized water reactor, it should be apparent to one skilled in the art that the examples may be applied to other types of power systems as described or with some obvious modification. For example, the examples or variations thereof may also be made operable with a sodium liquid metal reactor, pebble-bed reactor, or a reactor designed to operate in space, such as in a propulsion system with limited operational space.

Other examples may include various nuclear reactor technologies, such as nuclear reactors that employ uranium oxides, uranium hydrides, uranium nitrides, uranium carbides, mixed oxides, and/or other types of radioactive fuel. It should be noted that examples are not limited to any particular type of reactor cooling mechanism, nor to any particular type of fuel employed to produce heat within or associated with a nuclear reactor. Any rates and values described herein are provided by way of example only. Other rates and values may be determined through experimentation such as by construction of full scale or scaled models of a nuclear reactor system.

Having described and illustrated various examples herein, it should be apparent that other examples may be modified in arrangement and detail. We claim all modifications and variations coming within the spirit and scope of the following claims.

The invention claimed is:

1. A tube support assembly for a steam generator system comprising:
   a sheet having a thickness;
   a plurality of tubes of the steam generator system; and
   tabs projecting from a surface of the sheet to support a column of the plurality of tubes of the steam generator system, wherein the tabs are configured as three or more offset columns of tabs on the sheet, wherein three or more of the tabs are configured to directly contact a single tube of the plurality of tubes, and wherein the three or more tabs directly contact adjacent tubes in the column of tubes separated from each other by a distance equal to or greater than the thickness of the sheet.

2. The tube support assembly of claim 1, wherein the tabs are stamped out of the sheet, and wherein a thickness of the tabs equals the thickness of the sheet.

3. The tube support assembly of claim 1, wherein a first tab associated with a first column of tabs of the sheet is configured to contact a top surface of the single tube, wherein a second tab associated with a second column of tabs of the sheet is configured to contact a lower surface of the single tube, and wherein a third tab associated with a third column of tabs of the sheet is configured to contact the top surface of the single tube.

4. The tube support assembly of claim 3, wherein a fourth tab associated with the first column of tabs is configured to contact a lower surface of an adjacent tab, wherein the second tab is further configured to contact an upper surface of the adjacent tube, and wherein a fifth tab associated with the third column of tabs is configured to contact the lower surface of the adjacent tube.

5. The tube support assembly of claim 4, wherein the second tab is configured to space apart the single tube from the adjacent tube by a thickness the second tab.

6. The tube support assembly of claim 1, wherein the column of tubes comprises a first column of tubes supported by a first sheet, wherein the tube support assembly further comprises a second sheet configured to support a second column of tubes, and wherein the tube support assembly is configured to keep the first column of tubes separated from the second column of tubes by a distance which is equal to or greater than the thickness of the first sheet.

7. The tube support assembly of claim 6, wherein the first sheet comprises a stamped plate attached to a backing plate, and wherein a thickness of the first sheet equals a combined thickness of the stamped plate and the backing plate.

8. The tube support assembly of claim 1, further comprising a backing plate attached to the sheet, wherein the backing plate comprises through-holes located adjacent to one or more of the tabs.

9. The tube support assembly of claim 8, wherein the tabs are stamped out of the sheet leaving a plurality of punched holes, and wherein the punched holes align with the through-holes to provide passageways through both the sheet and the backing plate.

10. The tube support assembly of claim 1, wherein a second column of tabs of the sheet comprises one or more tabs that project out further from the sheet than tabs associated with a first column of tabs of the sheet, and wherein the one or more tabs project out further from the sheet than tabs associated with a third column of tabs of the sheet.

11. A tube support assembly for a steam generator system comprising:
a sheet having a thickness;
a plurality of tubes of the steam generator system; and
tabs projecting from a surface of the sheet to support a column of the tubes of the steam generator system, wherein the tabs are configured as offset columns of tabs on the sheet, wherein a first column of tabs of the sheet comprises tabs that project out further from the sheet than tabs associated with a second column of tabs of the sheet, wherein two or more of the tabs are configured to directly contact a single tube, and wherein the tabs are configured to keep adjacent tubes in the column of tubes separated from each other by a distance equal to or greater than the thickness of the sheet.

12. The tube support assembly of claim 11, further comprising an adjacent sheet, wherein the first column of tabs project from the sheet into a track associated with the adjacent sheet.

13. The tube support assembly of claim 12, further comprising a backing plate attached to the adjacent sheet, wherein the track is formed in the backing plate.

14. The tube support assembly of claim 13, wherein the second column of tabs abuts against the backing plate of the adjacent sheet.

15. The tube support assembly of claim 13, wherein the column of tubes supported by the tabs comprise a first column of tubes, wherein the adjacent sheet is configured to support a second column of tubes of the steam generator system, and wherein the tube support assembly is configured to keep the first column of tubes separated from the second column of tubes by a distance which is equal to or greater than a combined thickness of the adjacent sheet and the backing plate.

16. A tube support assembly for a steam generator system comprising:
a sheet having a thickness;
a plurality of tubes; and
two or more columns of tabs including a first column of tabs and a second column of tabs projecting from a surface of the sheet to support a column of tubes of the steam generator system, wherein the second column of tabs comprises a second tab that projects out further from the sheet than a first tab associated with the first column of tabs, wherein at least one tab from each of the first column of tabs and the second column of tabs are configured to directly contact a single tube, and wherein the tube support assembly is configured to keep adjacent tubes in the column of tubes separated from each other by a distance equal to or greater than the thickness of the sheet.

17. The tube support assembly of claim 16, further comprising a third column of tabs that project from the surface of the sheet to support the column of tubes, wherein at least one tab from each of the first column of tabs, the second column of tabs, and the third column of tabs are configured to contact the single tube.

18. The tube support assembly of claim 17, wherein the first tab from the first column of tabs contacts a lower surface of the single tube, wherein the second tab from the second column of tabs contacts an upper surface of the single tube, and wherein a third tab from the third column of tabs contacts the lower surface of the single tube.

19. The tube support assembly of claim 18, wherein the second tab projects out further from the sheet than both of the first tab and the third tab.

20. The tube support assembly of claim 19, further comprising a second sheet, wherein the second tab projects from the sheet into the second sheet.

* * * * *